(12) United States Patent
Meng et al.

(10) Patent No.: US 12,436,426 B2
(45) Date of Patent: Oct. 7, 2025

(54) LIGHT EMITTING SUBSTRATE AND VIRTUAL DISPLAY APPARATUS

(71) Applicant: BOE Technology Group Co., Ltd., Beijing (CN)

(72) Inventors: Xianqin Meng, Beijing (CN); Jin Yang, Beijing (CN); Pengxia Liang, Beijing (CN); Fang Cheng, Beijing (CN); Weiting Peng, Beijing (CN); Wei Wang, Beijing (CN); Xiaochuan Chen, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/579,596

(22) PCT Filed: Dec. 16, 2022

(86) PCT No.: PCT/CN2022/139445
§ 371 (c)(1),
(2) Date: Jan. 16, 2024

(87) PCT Pub. No.: WO2024/124512
PCT Pub. Date: Jun. 20, 2024

(65) Prior Publication Data
US 2025/0076705 A1 Mar. 6, 2025

(51) Int. Cl.
*G02F 1/13357* (2006.01)
*G02B 27/01* (2006.01)
(52) U.S. Cl.
CPC ..... *G02F 1/133606* (2013.01); *G02B 27/017* (2013.01)

(58) Field of Classification Search
CPC ............... G02F 1/133606; G02B 27/017
See application file for complete search history.

(56) References Cited

U.S. PATENT DOCUMENTS

| | | | |
|---|---|---|---|
| 6,231,200 B1 | 5/2001 | Shinohara et al. | |
| 11,333,924 B1* | 5/2022 | Lv | G02F 1/133612 |
| 2012/0262646 A1* | 10/2012 | Iwata | G02F 1/133536 |
| | | | 349/64 |
| 2014/0185273 A1* | 7/2014 | Tsai | G02B 5/045 |
| | | | 362/97.1 |
| 2018/0321489 A1 | 11/2018 | Tomaru | |
| 2019/0302329 A1 | 10/2019 | Jin et al. | |
| 2021/0191029 A1 | 6/2021 | Jin et al. | |

(Continued)

FOREIGN PATENT DOCUMENTS

CN 205157930 U 4/2016
CN 105739104 A 7/2016
(Continued)

OTHER PUBLICATIONS

International Search Report & Written Opinion mailed Sep. 14, 2023, regarding PCT/CN2022/139445.

*Primary Examiner* — Donald L Raleigh
(74) *Attorney, Agent, or Firm* — Intellectual Valley Law, P.C.

(57) ABSTRACT

A light emitting substrate is provided. The light emitting substrate includes a light source; a first light modulation layer having a first micro structure on a side closer to the light source; and a second light modulation layer having a second micro structure on a side away from the light source.

19 Claims, 16 Drawing Sheets

(56) References Cited

U.S. PATENT DOCUMENTS

| | | |
|---|---|---|
| 2021/0278724 A1 | 9/2021 | Jin et al. |
| 2022/0026712 A1 | 1/2022 | Nambara |
| 2022/0197052 A1 | 6/2022 | Makinen |
| 2022/0236610 A1* | 7/2022 | Ma .................... G09G 3/3426 |

FOREIGN PATENT DOCUMENTS

| | | |
|---|---|---|
| CN | 108469642 A | 8/2018 |
| CN | 109164636 A | 1/2019 |
| CN | 109633977 A | 4/2019 |
| CN | 110161758 A | 8/2019 |
| CN | 110908032 A | 3/2020 |
| CN | 111580308 A | 8/2020 |
| CN | 212255879 U | 12/2020 |
| CN | 113219666 A | 8/2021 |
| CN | 113767307 A | 12/2021 |
| CN | 114415376 A | 4/2022 |
| CN | 114442330 A | 5/2022 |
| JP | 2011059263 A | 3/2011 |
| JP | 2017094901 A | 6/2017 |
| JP | 2020184012 A | 11/2020 |
| JP | 2021097035 A | 6/2021 |
| KR | 20160104235 A | 9/2016 |

\* cited by examiner

LIGHT EMITTING SUBSTRATE AND VIRTUAL DISPLAY APPARATUS

CROSS-REFERENCE TO RELATED APPLICATION

This application is a national stage application under 35 U.S.C. § 371 of International Application No. PCT/CN2022/139445, filed Dec. 16, 2022, the contents of which are incorporated by reference in the entirety.

TECHNICAL FIELD

The present invention relates to display technology, more particularly, to a light emitting substrate and a virtual display apparatus.

BACKGROUND

The virtual reality technology is a technology based on immersion and imagination. The virtual reality technology uses display and computer technology to generate a simulated environment that allows the user to immerse and interact with virtual or realistic objects that the user feels through various inputs and outputs, hence the term virtual reality. By simulating human vision, hearing, touching, and so on, a user may experience a virtual reality environment as real as the real world. An exemplary VR device may include a head-mounted virtual display and gesture recognition and interaction handles.

SUMMARY

In one aspect, the present disclosure provides a light emitting substrate, comprising a light source; a first light modulation layer having a first micro structure on a side closer to the light source; and a second light modulation layer having a second micro structure on a side away from the light source.

Optionally, the first light modulation layer is configured to converge light; and the second light modulation layer is configured to deflect light.

Optionally, the second light modulation layer is on a side of the first light modulation layer away from the light source.

Optionally, the first light modulation layer is on a side of the second light modulation layer away from the light source.

Optionally, the first light modulation layer comprises a first base substrate and a plurality of first protrusions on the first base substrate; and a refractive index of the plurality of first protrusions is greater than a refractive index of the first base substrate.

Optionally, the plurality of first protrusions are a plurality of pyramids.

Optionally, an apex of a respective pyramid of the plurality of pyramids is on a side of a base of the respective pyramid closer to the light source; and the base of a respective pyramid is in contact with the first base substrate, or in contact with an intermediate layer on a side of the plurality of pyramids closer to the first base substrate.

Optionally, an apex of a respective pyramid of the plurality of pyramids is on a side of a base of the respective pyramid away from the light source; and the apex of a respective pyramid is in contact with the first base substrate, or in contact with an intermediate layer on a side of the plurality of pyramids closer to the first base substrate.

Optionally, the plurality of pyramids are a plurality of non-uniform pyramids; wherein the plurality of pyramids have different pitches; and/or wherein an apex of at least a first pyramid of the plurality of pyramids is on a side of a base of the first pyramid closer to the light source, and an apex of at least a second pyramid of the plurality of pyramids is on a side of a base of the second pyramid away from the light source.

Optionally, the second light modulation layer comprises a second base substrate and a plurality of second protrusions on the second base substrate; and the plurality of second protrusions are a plurality of ring protrusions surrounding a central region of the second light modulation layer.

Optionally, ring frame widths of the plurality of ring protrusions gradually change from the central region to an edge region of the second light modulation layer.

Optionally, the central region of the second light modulation layer is absent of a ring protrusion.

Optionally, in a cross-section along a plane perpendicular to a surface of the second base substrate and intersecting the plurality of second protrusions, a respective ring protrusion of the plurality of ring protrusions has a triangular shape.

Optionally, a refractive index of the plurality of ring protrusions is greater than a refractive index of the second base substrate.

In another aspect, the present disclosure provides a display apparatus, comprising the light emitting substrate described herein; and one or more integrated circuits.

Optionally, the light source is configured to emit light along a direction toward the first modulation layer and the second modulation layer; and the light emitting substrate is part of a display panel of the display apparatus.

Optionally, the display apparatus further comprises a display panel; a lens; and a reflective layer configured to reflect light emitted from the light source; wherein at least one of a first light modulation layer or a second light modulation layer on a side of the light source away from the reflective layer; the first light modulation layer is configured to converge light; and the second light modulation layer is configured to deflect light.

Optionally, the first light modulation layer is configured to converge light so that light exited from the first light modulation layer having luminance at least equal to or greater than 80% of a maximum luminance is limited to an exiting angle in a range substantially the same as or less than a range of angles with respect to a surface of the display panel of light emitted from subpixels in a respective region of the display panel and that can be received by an eye box; wherein an absolute maximum value of the range of angles is defined by:

$$\tan^{-1}\left(\frac{f}{\frac{h}{2}-\left(a+\frac{d}{2}\right)}\right) - \tan^{-1}\left(\frac{f}{\frac{h}{2}-\left(a-\frac{d}{2}\right)}\right);$$

wherein h stands for a width of the display panel, a stands for a radius of the lens minus a radius of the eye box, f stands for a focal length of the lens, and d stands for a diameter of the eye box.

Optionally, the range of angles is between -9 degrees and 9 degrees.

Optionally, light deflected by the second light modulation layer has a deflection angle defined by:

$$\theta = \gamma + \frac{\beta - \gamma}{2} = \frac{1}{2}(\gamma + \beta);$$

wherein θ stands for the deflection angle, β stands for a maximum value of an angle with respect to a surface of the display panel of light emitted from subpixels in a region of the display panel and that can be received by an eye box, and γ stands for a minimum value of the angle with respect to the surface of the display panel of light emitted from the subpixels in the region of the display panel and that can be received by the eye box.

Optionally, the deflection angle is between-16 degrees to 16 degrees.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a light emitting substrate and a virtual display apparatus that substantially obviate one or more of the problems due to limitations and disadvantages of the related art. In one aspect, the present disclosure provides a light emitting substrate. In some embodiments, the light emitting substrate includes a light source; a first light modulation layer having a first micro structure on a side closer to the light source; and a second light modulation layer having a second micro structure on a side away from the light source. Optionally, the first light modulation layer is configured to converge light. Optionally, the second light modulation layer is configured to deflect light.

Figure 1A:
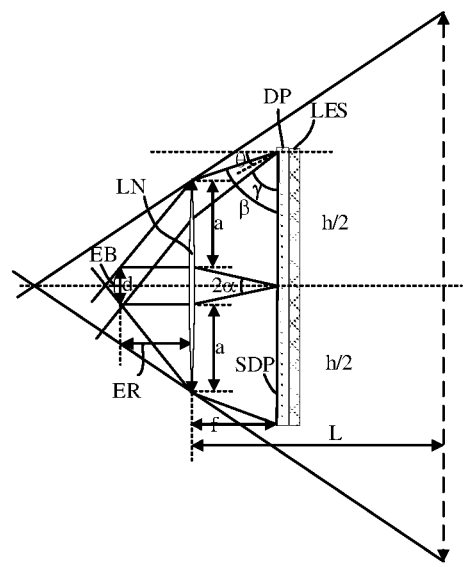
FIG. 1A illustrates a light path in a virtual reality display apparatus in some embodiments according to the present disclosure.
Figure 1B:
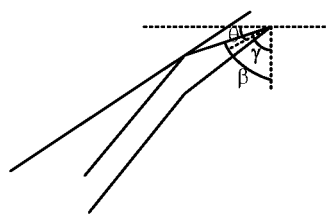
FIG. 1B is a zoom-in view of certain angles in FIG. 1A.

FIG. 1A illustrates a light path in a virtual reality display apparatus in some embodiments according to the present disclosure. FIG. 1B is a zoom-in view of certain angles in FIG. 1A. Referring to FIG. 1A, the virtual reality display apparatus in some embodiments includes a display panel DP. Optionally, the virtual reality display apparatus further includes a light emitting substrate LES for providing back light to the display panel DP, for example, the display panel DP may be a liquid crystal display panel. Optionally, the light emitting substrate LES includes a mini light emitting diode or a micro light emitting diode as a light source.

In some embodiments, the virtual reality display apparatus further includes a lens LN. Light transmitted through the display panel DP and the lens LN, and enters into an eye box EB (e.g., an observer's pupil or a recording camera). The eye box EB perceives a virtual image. In the virtual reality display apparatus, the display panel DP and the light emitting substrate LES together are configured to provide image display information to the eye box EB.

Referring to FIG. 1A and FIG. 1B, with respect to a central region of the display panel DP, the eye box EB can receive light in a certain range as indicated by a zone denoted by "2α", and light emitted from the central region but outside that range is not received by the eye box EB. Similarly, with respect to a non-central region (e.g., an edge region) of the display panel DP, the eye box EB can receive light in a certain range that is inside a zone denoted by "β" but outside the zone denoted by "γ", and light emitted from the non-central region (e.g., the edge region) but outside that range is not received by the eye box EB. Light outside the ranges and not received by the eye box EB is wasted.

In some embodiments, the eye box EB has a diameter d, an eye relief ER denotes a distance between the eye box EB and the lens LN, the lens LN has a focal length f. Accordingly, referring to FIG. 1A, a minimum aperture φ of the lens LN can be determined as:

$$\varphi = 2*a + d. \tag{1}$$

A field of view FOV of the virtual reality display apparatus is correlated to the eye relief ER, and the correlation can be determined by Equation (2) below:

$$a = \tan(FOV/2)*ER. \tag{2}$$

A range of angles with respect to a surface of the display panel DP of light emitted from subpixels in the central region of the display panel DP and that can be received by the eye box EB may be determined by Equation (3) below:

$$2\alpha = 2*\tan^{-1}\left(\frac{d}{2f}\right). \tag{3}$$

Optionally, the surface of the display panel DP refers to a light emitting surface of the display panel DP. In the example depicted in FIG. 1A, the surface of the display panel DP is denoted as SDP.

A maximum value β of an angle with respect to a surface of the display panel DP of light emitted from subpixels in the non-central region (e.g., the edge region) of the display panel DP and that can be received by the eye box EB may be determined by Equation (4) below:

$$\beta = \tan^{-1}\left(f\bigg/\left(\frac{h}{2} - \left(a + \frac{d}{2}\right)\right)\right). \tag{4}$$

A minimum value γ of an angle with respect to a surface of the display panel DP of light emitted from subpixels in the non-central region (e.g., the edge region) of the display panel DP and that can be received by the eye box EB may be determined by Equation (5) below:

$$\gamma = \tan^{-1}\left(f\bigg/\left(\frac{h}{2} - \left(a - \frac{d}{2}\right)\right)\right). \tag{5}$$

A range of angles with respect to a surface of the display panel DP of light emitted from subpixels in the non-central region (e.g., the edge region) of the display panel DP and that can be received by the eye box EB may be determined by Equation (6) below:

$$\beta - \gamma = \tan^{-1}\left(\frac{f}{\frac{h}{2} - \left(a + \frac{d}{2}\right)}\right) - \tan^{-1}\left(\frac{f}{\frac{h}{2} - \left(a - \frac{d}{2}\right)}\right). \tag{6}$$

A deflection angle θ corresponding to the non-central region (e.g., the edge region) of the display panel DP is expressed as:

$$\theta = \gamma + \frac{\beta - \gamma}{2} = \frac{1}{2}(\gamma + \beta). \tag{7}$$

In one example, the diameter d of the eye box EZ is 8 mm, the eye relief ER is 20 mm, and a size of the display panel is 45 mm by 45 mm with a diagonal length of 63.5 mm (e.g., 2.5 inches). The angles 2α, β, γ, and (β–γ) can be determined according to the Equations (1) to (7). Table 1 lists the angles 2α, β, γ, and (β–γ) in one exemplary virtual display apparatus.

TABLE 1

Angles 2α, β, γ, and (β – γ) in a virtual display apparatus.

| | 2α | β | γ | β – γ |
|---|---|---|---|---|
| Angle/° | 17.435 | −7.997 | −24.092 | 16.095 |

Figure 2:
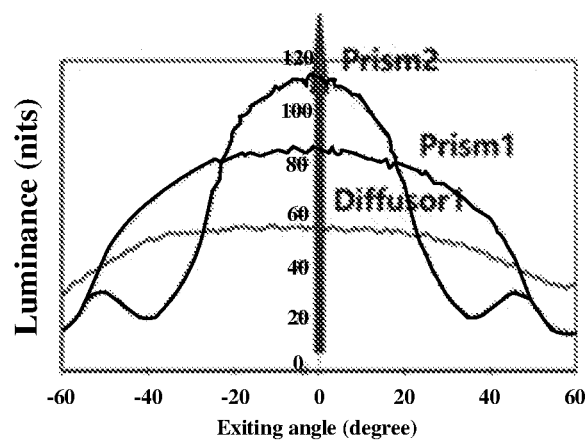
FIG. 2 shows light convergence of light emitted from a light emitting substrate in a related virtual display apparatus.

FIG. 2 shows light convergence of light emitted from a light emitting substrate in a related virtual display apparatus. As shown in FIG. 2, in related virtual display apparatus, light emitted from a light source (e.g., a micro light emitting diode light source) transmits through a diffusor ("Diffusor1"), and is converged using one or more prisms (e.g., a first prism "Prism1" and a second prism "Prism2"). Referring to FIG. 2, exiting light at an exiting angle of 0 degree has a maximum luminance value. Exiting light having luminance at least equal to or greater than 80% of the maximum luminance is limited to an exiting angle in a range of −23 degrees to 23 degrees.

Figure 3:
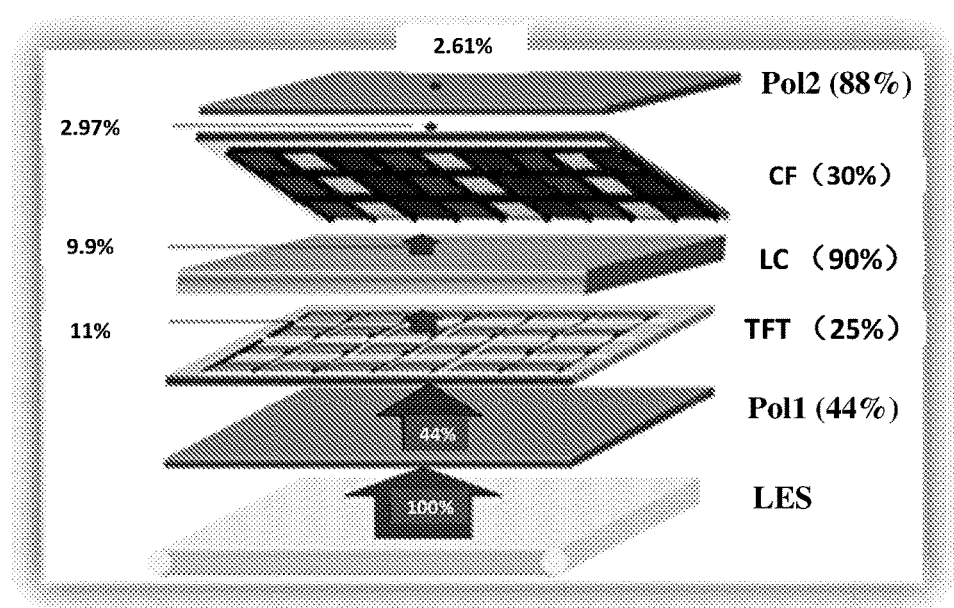
FIG. 3 illustrates light transmittance rate in a related virtual display apparatus.

FIG. 3 illustrates light transmittance rate in a related virtual display apparatus. Referring to FIG. 3, light transmittance rate through a first polarizer Pol1 is 44%, light transmittance rate through a thin film transistor substrate TFT is 25%, light transmittance rate through a liquid crystal layer LC is 90%, light transmittance rate through a color filter CF is 30%, and light transmittance rate through a second polarizer Pol2 is 88%. Only 11% of light emitted from the light emitting substrate LES transmits through the thin film transistor substrate TFT. Only 9.9% of light emitted from the light emitting substrate LES transmits through the liquid crystal layer LC. Only 2.97% of light emitted from the light emitting substrate LES transmits through the color filter CF. Only 2.61% of light emitted from the light emitting substrate LES transmits through the second polarizer Pol2.

The inventors of the present disclosure discover that the low light utilization rate in the related virtual display apparatus can be contributed to the waste of light outside the ranges that can be received by the eye box, as discussed above, in addition to the light loss during transmission through the display panel. The inventors of the present disclosure discovered that, during the process of exiting light transmitting through the display panel, exiting light having luminance at least equal to or greater than 80% of the maximum luminance is limited to an exiting angle in a range of −23 degrees to 23 degrees. However, referring to Table 1, the range of angle 2α is limited to [−17.435°/2, 17.435°/2] with respect to the central region of the display panel, and the range of angle (β–γ) is limited to [−16.095°/2, 16.095°/2] with respect to the non-central region (e.g., the edge region) of the display panel, both of these ranges are much smaller than the range of −23 degrees to 23 degrees. The inventors of the present disclosure discovered that a large portion of the exiting light having luminance at least equal to or greater than 80% of the maximum luminance is still not utilized in the related virtual display apparatus. The inventors of the present disclosure discovered that, the intricate structure of the virtual display apparatus according to the present disclosure can unexpectedly enhance light utilization rate.

In some embodiments according to the present disclosure, light exited from the light emitting substrate is converged so that exiting light having luminance at least equal to or greater than 80% of the maximum luminance is limited to an exiting angle in a range substantially the same as or less than a range of angles with respect to a surface of the display panel DP of light emitted from subpixels in a respective region (e.g., a central region, an edge region, or any individual region) of the display panel DP and that can be received by the eye box EB. As used herein, the term "substantially the same" refers to a difference between two values not exceeding 20% of a base value (e.g., one of the two values), e.g., not exceeding 18%, not exceeding 16%, not exceeding 14%, not exceeding 12%, not exceeding 10%, not exceeding 8%, not exceeding 6%, not exceeding 4%, not exceeding 2%, not exceeding 1%, not exceeding 0.5%, not exceeding 0.1%, not exceeding 0.05%, and not exceeding 0.01%, of the base value.

In one example, the light exited from the light emitting substrate is converged so that exiting light having luminance at least equal to or greater than 80% of the maximum luminance is limited to an exiting angle in a range of −9 degrees to 9 degrees.

Equation (3) discussed above with respect to the central region of the display panel may be considered as a special case of Equation (6) with respect to the non-central region of the display panel. For example, with respect to the central region, β=α, γ=−α. Thus, β−γ=2α.

Similarly, the deflection angle θ with respect to the central region of the display panel may also be calculated using the more generally applicable expression of Equation (7), as shown below:

$$\theta = \gamma + \frac{\beta - \gamma}{2} = \frac{1}{2}(\gamma + \beta) = \left(\frac{1}{2}(-\alpha + \alpha)\right) = 0$$

The deflection angle θ with respect to the central region of the display panel is zero.

Accordingly, Equation (6) and Equation (7) discussed above are applicable to any individual region of the display panel, including a central region, a non-central region, a non-edge region, and an edge region.

In one example discussed in the context of Table 1, the diameter d of the eye box EZ is 8 mm, the eye relief ER is 20 mm, and a size of the display panel is 45 mm by 45 mm with a diagonal length of 63.5 mm (e.g., 2.5 inches). The range of angles according to Equation (6) varies from [−16.095°/2, 16.095°/2] (with respect to an edge region) to [−17.435°/2, 17.435°/2] (with respect to a central region). The deflection angle according to Equation (7) with respect to the edge region of the display panel is (−7.997°+16.095°/2)=16.0445°. The deflection angle according to Equation (7) with respect to the central region of the display panel is zero degree. Thus, the deflection angle according to Equation (7) gradually (continuously or step-wise) varies from zero degree to 16.0445 degrees from the central region to the edge region. Table 2 shows ranges of angles according to Equation (6) and deflection angles according to Equation (7) with respect to various regions of a display panel as denoted by distances from a center of the display panel.

Table 2 shows ranges of angles according to Equation (6) and deflection angles according to Equation (7) with respect to various regions of a display panel as denoted by distances from a center of the display panel.

| No. | Distance from the center/mm | β - γ | θ |
|---|---|---|---|
| -13 | -31.5 | 16.10 | 16.04 |
| -12 | -30 | 16.23 | 15.28 |
| -11 | -27.5 | 16.41 | 14.07 |
| -10 | -25 | 16.56 | 12.85 |
| -9 | -22.5 | 16.72 | 11.60 |
| -8 | -20 | 16.89 | 10.31 |
| -7 | -17.5 | 16.99 | 9.07 |
| -6 | -15 | 17.13 | 7.77 |
| -5 | -12.5 | 17.20 | 6.51 |
| -4 | -10 | 17.29 | 5.21 |
| -3 | -7.5 | 17.36 | 3.91 |
| -2 | -5 | 17.38 | 2.62 |
| -1 | -2.5 | 17.42 | 1.31 |
| 0 | 0 | 17.45 | 0.00 |
| 1 | 2.5 | 17.42 | -1.31 |
| 2 | 5 | 17.38 | -2.62 |
| 3 | 7.5 | 17.36 | -3.91 |
| 4 | 10 | 17.29 | -5.21 |
| 5 | 12.5 | 17.20 | -6.51 |
| 6 | 15 | 17.13 | -7.77 |
| 7 | 17.5 | 16.99 | -9.07 |
| 8 | 20 | 16.89 | -10.31 |
| 9 | 22.5 | 16.72 | -11.60 |
| 10 | 25 | 16.56 | -12.85 |
| 11 | 27.5 | 16.41 | -14.07 |
| 12 | 30 | 16.23 | -15.28 |
| 13 | 31.5 | 16.10 | -16.04 |

Figure 4:
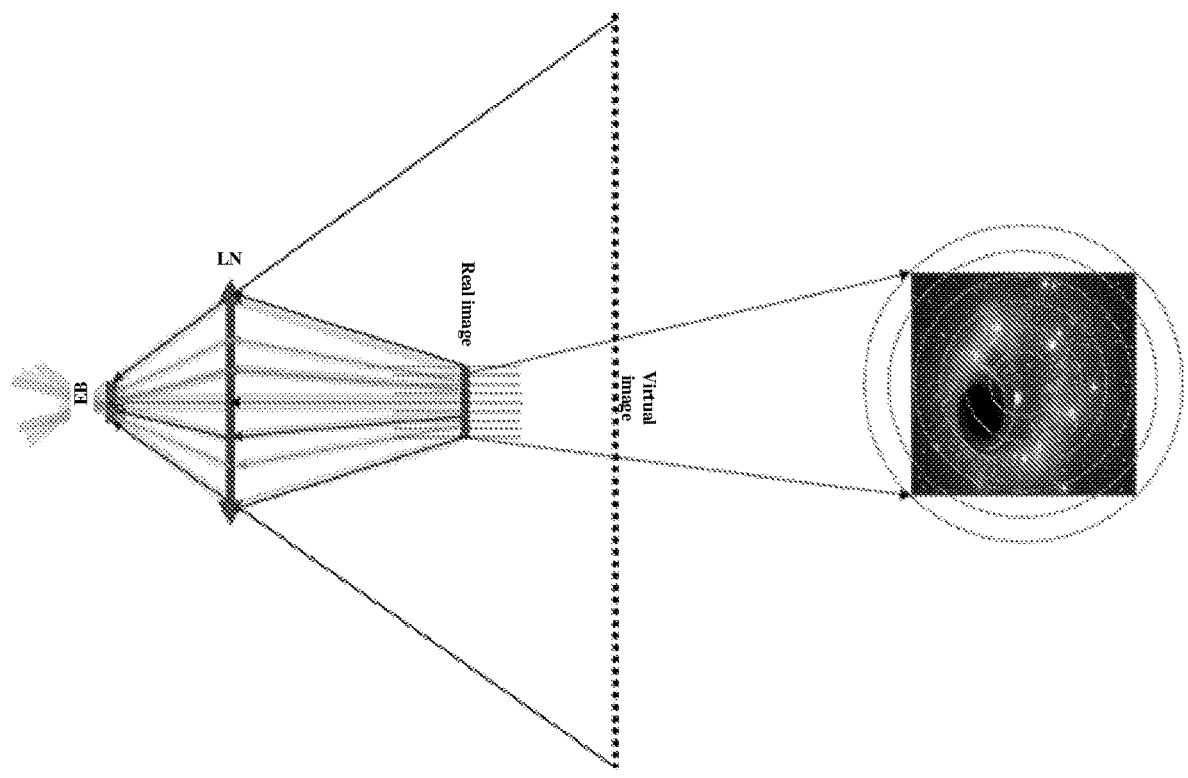
FIG. 4 illustrates a light path in a virtual reality display apparatus in some embodiments according to the present disclosure.

As shown in Table 2, with respect to regions on two opposite sides of the center and equi-distance to the center, the ranges of angles according to Equation (6) (e.g., β-γ) are the same. With respect to regions on two opposite sides of the center and equi-distance to the center, the deflection angles according to Equation (7) (e.g., θ) have a same absolute value but with opposite signs. FIG. 4 illustrates a light path in a virtual reality display apparatus in some embodiments according to the present disclosure. Various regions of the display panel in some embodiments may be ring-shaped regions depicted in FIG. 4 (dotted lines on the right side of the figure). FIG. 4 shows different deflection angles corresponding to different regions of the display panel.

In some embodiments, the virtual reality display apparatus is a virtual reality google. In some embodiments, the virtual reality google includes two portions corresponding to a left eye and a right eye of a user. In some embodiments, each portion of the virtual reality google has a structure of the virtual reality display apparatus described in the present disclosure, e.g., the structure depicted in FIG. 1A.

Figure 5A:
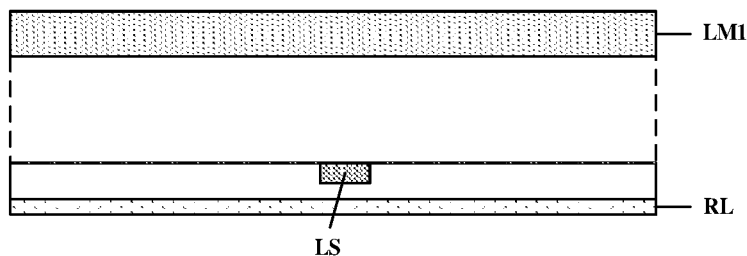
FIG. 5A is a schematic diagram illustrating the structure of a light emitting substrate in a virtual display apparatus in some embodiments according to the present disclosure.

FIG. 5A is a schematic diagram illustrating the structure of a light emitting substrate in a virtual display apparatus in some embodiments according to the present disclosure. Referring to FIG. 5A, the light emitting substrate in some embodiments includes a reflective layer RL, a light source LS on the reflective layer RL, a first light modulation layer LM1 on a side of the light source LS away from the reflective layer RL. In some embodiments, the first light modulation layer LM1 is configured to converge light. Optionally, the first light modulation layer LM1 is configured to converge light so that light exited from the first light modulation layer LM1 having luminance at least equal to or greater than 80% of the maximum luminance is limited to an exiting angle in a range substantially the same as or less than a range of angles with respect to a surface of the display panel DP of light emitted from subpixels in a respective region (e.g., a central region, an edge region, or any individual region) of the display panel and that can be received by the eye box. Optionally, the first light modulation layer LM1 is configured to converge light so that light exited from the first light modulation layer LM1 having luminance at least equal to or greater than 80% of the maximum luminance is limited to an exiting angle in a range substantially the same as or less than a range of angles according to Equation (6).

Figure 5B:
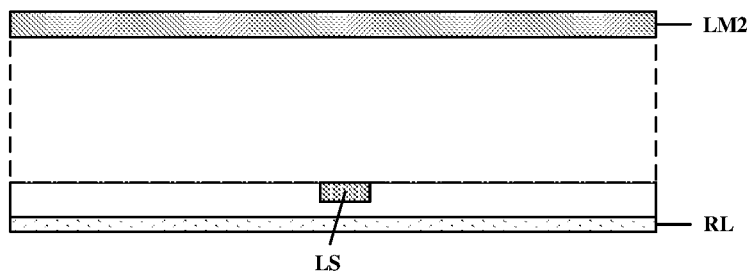
FIG. 5B is a schematic diagram illustrating the structure of a light emitting substrate in a virtual display apparatus in some embodiments according to the present disclosure.

FIG. 5B is a schematic diagram illustrating the structure of a light emitting substrate in a virtual display apparatus in some embodiments according to the present disclosure. Referring to FIG. 5B, the light emitting substrate in some embodiments includes a reflective layer RL, a light source LS on the reflective layer RL, a second light modulation layer LM2 on a side of the light source LS away from the reflective layer RL. In some embodiments, the second light modulation layer LM2 is configured to deflect light. Optionally, the second light modulation layer LM2 is configured to deflect light emitted from the light emitting substrate toward a central region of a display panel. Optionally, the second light modulation layer LM2 is configured to deflect light emitted from the light emitting substrate so that the light exits the second light modulation layer LM2 has a deflection angle according to Equation (7).

Figure 5C:
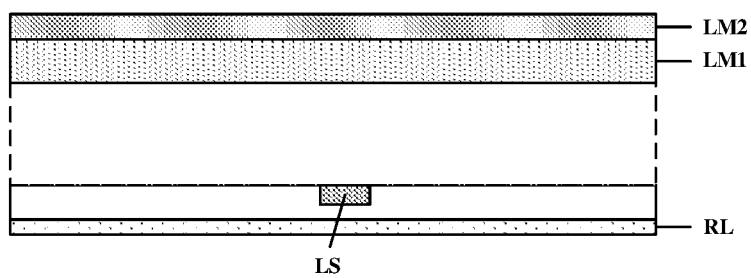
FIG. 5C is a schematic diagram illustrating the structure of a light emitting substrate in a virtual display apparatus in some embodiments according to the present disclosure.
Figure 5D:
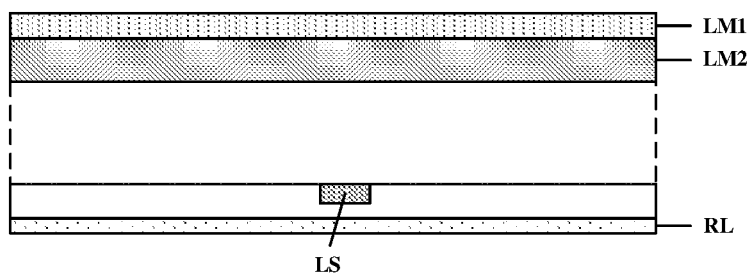
FIG. 5D is a schematic diagram illustrating the structure of a light emitting substrate in a virtual display apparatus in some embodiments according to the present disclosure.

FIG. 5C is a schematic diagram illustrating the structure of a light emitting substrate in a virtual display apparatus in some embodiments according to the present disclosure. Referring to FIG. 5C, the light emitting substrate in some embodiments includes a reflective layer RL, a light source LS on the reflective layer RL, a first light modulation layer LM1 on a side of the light source LS away from the reflective layer RL, and a second light modulation layer LM2 on a side of the first light modulation layer LM1 away from the light source LS. FIG. 5D is a schematic diagram illustrating the structure of a light emitting substrate in a virtual display apparatus in some embodiments according to the present disclosure. Referring to FIG. 5D, the light emitting substrate in some embodiments includes a reflective layer RL, a light source LS on the reflective layer RL, a second light modulation layer LM2 on a side of the light source LS away from the reflective layer RL, and a first light modulation layer LM1 on a side of the second light modulation layer LM2 away from the light source LS. The inventors of the present disclosure discover that a synergistic effect can be achieved with surprisingly enhanced light utilization rate in a virtual display apparatus according to the present disclosure. In some embodiments, the first light modulation layer LM1 is configured to converge light, and the second light modulation layer LM2 is configured to deflect light. Optionally, the first light modulation layer LM1 is configured to converge light so that light exited from the first light modulation layer LM1 having luminance at least equal to or greater than 80% of the maximum luminance is limited to an exiting angle in a range substantially the same as or less than a range of angles with respect to a surface of the display panel of light emitted from subpixels in a respective region (e.g., a central region, an edge region, or any individual region) of the display panel DP and that can be received by the eye box; and the second light modulation layer LM2 is configured to deflect light emitted from the light emitting substrate toward a central region of a display panel. Optionally, the first light modulation layer LM1 is configured to converge light so that light exited from the first light modulation layer LM1 having luminance at least equal to or greater than 80% of the maximum luminance is limited to an exiting angle in a range substantially the same as or less than a range of angles according to Equation (6); and the second light modulation layer LM2 is configured to deflect light emitted from the light emitting substrate so that the light exits the second light modulation layer LM2 has a deflection angle according to Equation (7).

Figure 5E:
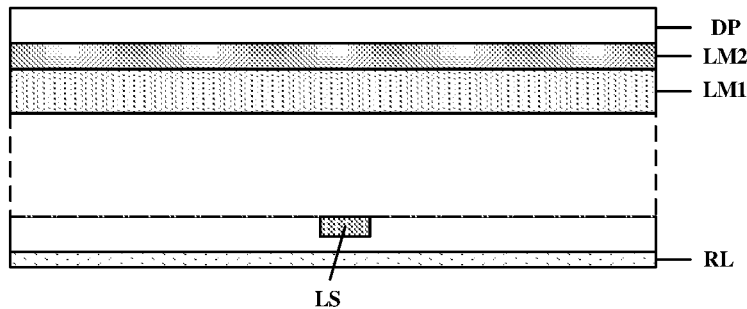
FIG. 5E is a schematic diagram illustrating the structure of a virtual display apparatus in some embodiments according to the present disclosure.

FIG. 5E is a schematic diagram illustrating the structure of a virtual display apparatus in some embodiments according to the present disclosure. Referring to FIG. 5E, the virtual display apparatus in some embodiments includes a reflective layer RL, a light source LS on the reflective layer RL, a first light modulation layer LM1 and/or a second light modulation layer LM2 on a side of the light source LS away from the reflective layer RL, and a display panel DP on a side of the first light modulation layer LM1 and/or the second light modulation layer LM2 away from the light source LS. Light emitted from the light source LS is first modulated by the first light modulation layer LM1 and/or the second light modulation layer LM2, the modulated light is provided to the display panel DP for image display.

Figure 5F:
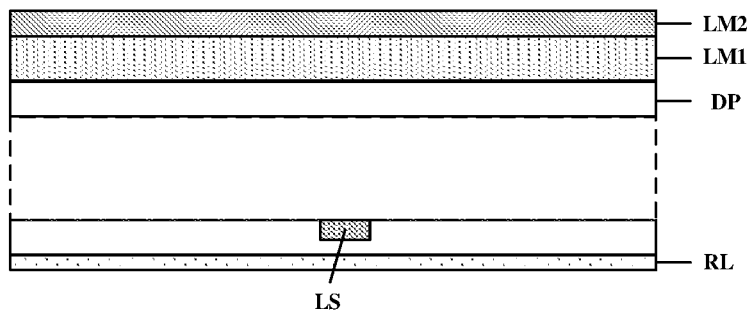
FIG. 5F is a schematic diagram illustrating the structure of a virtual display apparatus in some embodiments according to the present disclosure.

FIG. 5F is a schematic diagram illustrating the structure of a virtual display apparatus in some embodiments according to the present disclosure. Referring to FIG. 5F, the virtual display apparatus in some embodiments includes a reflective layer RL, a light source LS on the reflective layer RL, a display panel DP on a side of the light source LS away from the reflective layer RL, and a first light modulation layer LM1 and/or a second light modulation layer LM2 on a side of the display panel DP away from the light source LS. Light emitted from the light source is first provided to the display panel DP, and light transmitted through the display panel DP is subsequently modulated by the first light modulation layer LM1 and/or the second light modulation layer LM2.

Various appropriate display panels may be used in the present virtual display apparatus. Examples of appropriate display panels include a liquid crystal display panel, an organic light emitting diode display panel, a liquid crystal on silicon display panel, and a micro light emitting diode display panel. Optionally, the display panel is a high-resolution micro display panel. Liquid crystal display panels are cost effective options for the present virtual display apparatus.

Figure 6A:
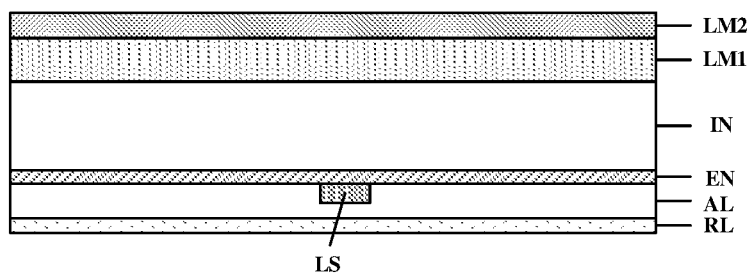
FIG. 6A is a schematic diagram illustrating the structure of a light emitting substrate in a virtual display apparatus in some embodiments according to the present disclosure.
Figure 6B:
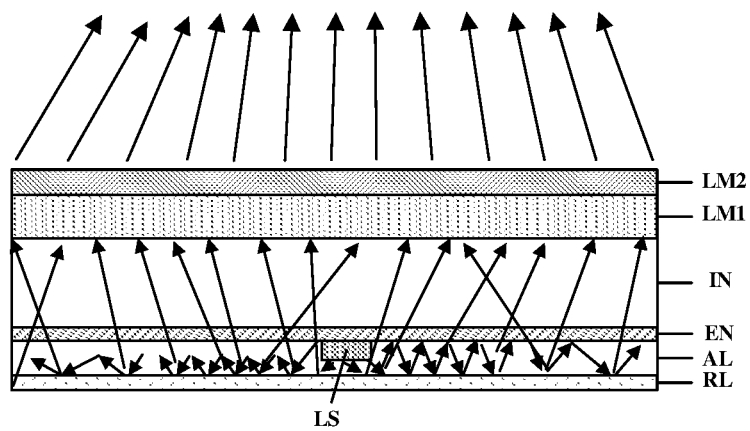
FIG. 6B illustrates a light path of light emitted from the light emitting substrate depicted in FIG. 6A.

FIG. 6A is a schematic diagram illustrating the structure of a light emitting substrate in a virtual display apparatus in some embodiments according to the present disclosure. FIG. 6B illustrates a light path of light emitted from the light emitting substrate depicted in FIG. 6A. Referring to FIG. 6A and FIG. 6B, the light emitting substrate in some embodiments includes a reflective layer RL, an adhesive layer AL on the reflective layer RL, a light source LS on a side of the adhesive layer AL away from the reflective layer RL, and an encapsulating layer EN on a side of the light source LS away from the adhesive layer AL. The encapsulating layer EN encapsulates the light source LS. The adhesive layer AL adheres the reflective layer RL with the light source LS and the encapsulating layer EN.

In some embodiments, the light emitting substrate further includes an insulating layer IN on a side of the encapsulating layer EN away from the reflective layer RL, a first light modulation layer LM1 on a side of the insulating layer IN away from the encapsulating layer EN, and a second light modulation layer LM2 on a side of the first light modulation layer LM1 away from the insulating layer IN. As shown in FIG. 6B, light modulated by the first light modulation layer LM1 and the second light modulation layer LM2 is converged and deflected.

Various appropriate reflective layers may be used in the present light emitting substrate. Examples of appropriate reflective materials include various metals and alloys. In one example, the reflective layer RL is a non-Lambertian reflector. In another example, the reflective layer RL is a Lambertian reflector to achieve Lambertian scattering (as shown in FIG. 6B). Optionally, the reflective layer RL has a reflectivity greater than 90%, e.g., greater than 92%, greater than 94%, greater than 96%, greater than 98%, greater than 99%, or greater than 99.5%.

The encapsulating layer EN provides mechanical protection to improve reliability of the light source, enhances heat dissipation ability to reduce chip junction temperature and enhance light source performance, provides optical control to enhance light output efficiency and optimize light beam distribution. Optionally, the encapsulating layer EN includes components that provides power supply management including AC/DC conversion and power control. In one example, the encapsulating layer EN is a chip-on-board (COB) encapsulation layer. In another example, the encapsulating layer EN has a thickness in a range of 0.2 mm to 0.3 mm.

Various appropriate insulating materials may be used for making the insulating layer IN. Examples of materials suitable for making the insulating layer IN include, but are not limited to, glass, resins, adhesive materials, quartz, polyimide, polyester, polychlorinated biphenyls, fluorinated polymers, and optical glass. Optionally, the insulating layer IN is a transparent insulating layer. In one example, the insulating layer IN is a glass layer. In another example, the insulating layer IN has a refractive index of 1.52.

Various appropriate light sources may be used in the present disclosure. Examples of appropriate light sources include a light emitting diode such as a mini light emitting diode light source and a micro light emitting diode light source. In one example, the light source LS is a mini light emitting diode light source having a size in a range of 50 μm to 500 μm. The light source LS may be configured to emit light of various appropriate colors. In one example, the light source LS is a blue light source.

Figure 7A:
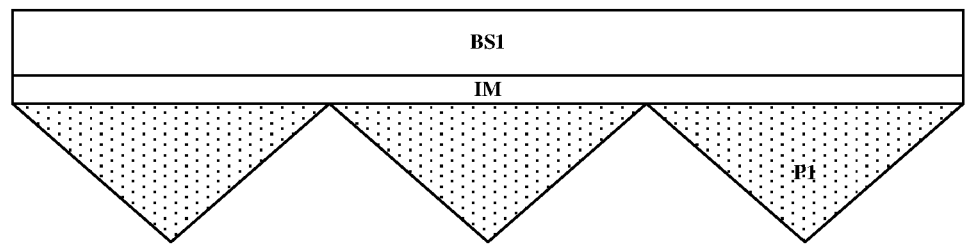
FIG. 7A is a schematic diagram illustrating the structure of a first light modulation layer in some embodiments according to the present disclosure.
Figure 7B:
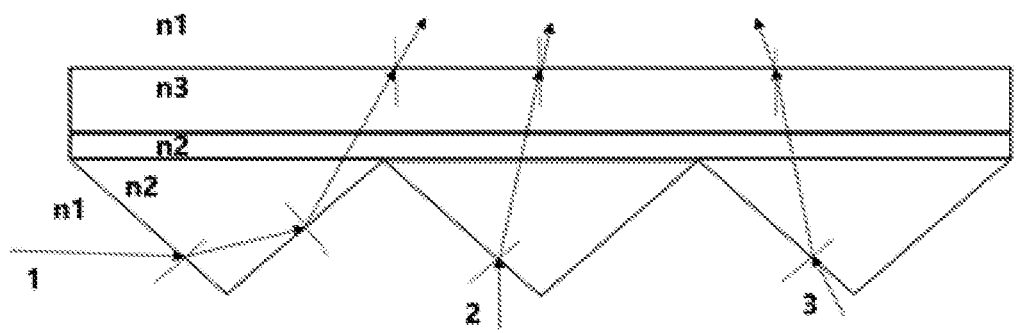
FIG. 7B illustrates a light path transmitting through the first light modulation layer depicted in FIG. 7A.

FIG. 7A is a schematic diagram illustrating the structure of a first light modulation layer in some embodiments according to the present disclosure. Referring to FIG. 7A, the first light modulation layer in some embodiments includes a first base substrate BS1 and a plurality of first protrusions P1 on the first base substrate BS1. Optionally, the first light modulation layer further includes an intermediate layer IM on a side of the first base substrate BS1 closer to the plurality of first protrusions P1, and on a side of the plurality of first protrusions P1 closer to the first base substrate BS1. FIG. 7B illustrates a light path transmitting through the first light modulation layer depicted in FIG. 7A. Referring to FIG. 7B, n1 denotes a refractive index of air, n2 denotes a refractive index of the plurality of first protrusions P1, and n3 denotes a refractive index of the first base substrate BS1. Optionally, the intermediate layer IM has a same refractive index as the plurality of first protrusions P1. FIG. 7B illustrates convergence of light transmitting through the first light modulation layer.

Optionally, the refractive index of the plurality of first protrusions P1 is greater than the refractive index of the first base substrate BS1. In one example, n2 is in a range of 1.60 to 1.80, and n3 is in a range of 1.50 to 1.60. The refractive index of the first base substrate BS1 is greater than the refractive index of air.

Various appropriate materials may be used for making the first light modulation layer. Examples of appropriate materials for making the first base substrate BS1 include silicon oxide (SiOy), silicon nitride (SiNy, e.g., $Si_3N_4$), silicon oxynitride ($SiO_xN_y$), and organic polymers such as poly (methyl methacrylate). Examples of appropriate materials for making the plurality of first protrusions P1 include photoresist materials. Examples of appropriate materials for making the intermediate layer IM include photoresist materials.

In some embodiments, the plurality of first protrusions P1 are a plurality of pyramids. Referring to FIG. 7A, in some embodiments, an apex of a respective pyramid is on a side of a base of the respective pyramid away from the first base substrate BS1.

Figure 7C:
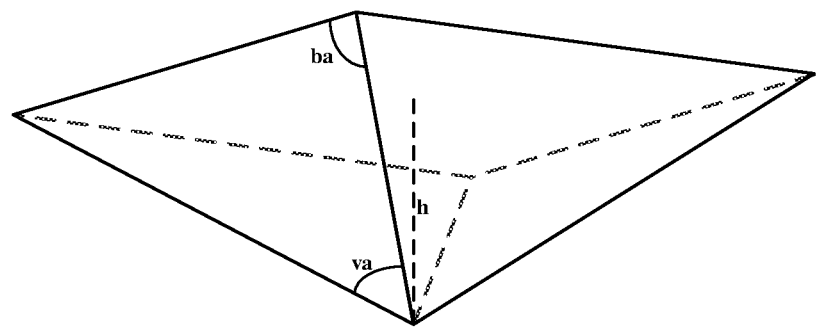
FIG. 7C is a schematic diagram illustrating the structure of a respective pyramid in some embodiments according to the present disclosure.

FIG. 7C is a schematic diagram illustrating the structure of a respective pyramid in some embodiments according to the present disclosure. Referring to FIG. 7C, in some embodiments, a vertex angle va of the respective pyramid is in a range of 100 degrees to 140 degrees, e.g., 100 degrees to 105 degrees, 105 degrees to 110 degrees, 110 degrees to 115 degrees, 115 degrees to 120 degrees, 120 degrees to 125 degrees, 125 degrees to 130 degrees, 130 degrees to 135 degrees, or 135 degrees to 140 degrees.

In some embodiments, a base angle of face ba of the respective pyramid is in a range of 20 degrees to 40 degrees, e.g., 20 degrees to 25 degrees, 25 degrees to 30 degrees, 30 degrees to 35 degrees, or 35 degrees to 40 degrees.

In some embodiments, the respective pyramid has a height in a range of 10 μm to 20 μm, e.g., 10 μm to 12 μm, 12 μm to 14 μm, 14 μm to 16 μm, 16 μm to 18 μm, or 18 μm to 20 μm. In one example the respective pyramid has a height of 15 μm.

In some embodiments, the plurality of pyramids have a pitch in a range of 30 μm to 70 μm, e.g., 30 μm to 35 μm, 35 μm to 40 μm, 40 μm to 45 μm, 45 μm to 50 μm, 50 μm to 55 μm, 55 μm to 60 μm, 60 μm to 65 μm, or 65 μm to 70 μm. In one example, the plurality of pyramids have a pitch of 50 μm.

In some embodiments, the plurality of pyramids have duty cycle of at least 80%, e.g., at least 82%, at least 84%, at least 86%, at least 88%, at least 90%, at least 92%, at least 94%, at least 96%, at least 98%, or 100%.

Figure 7D:
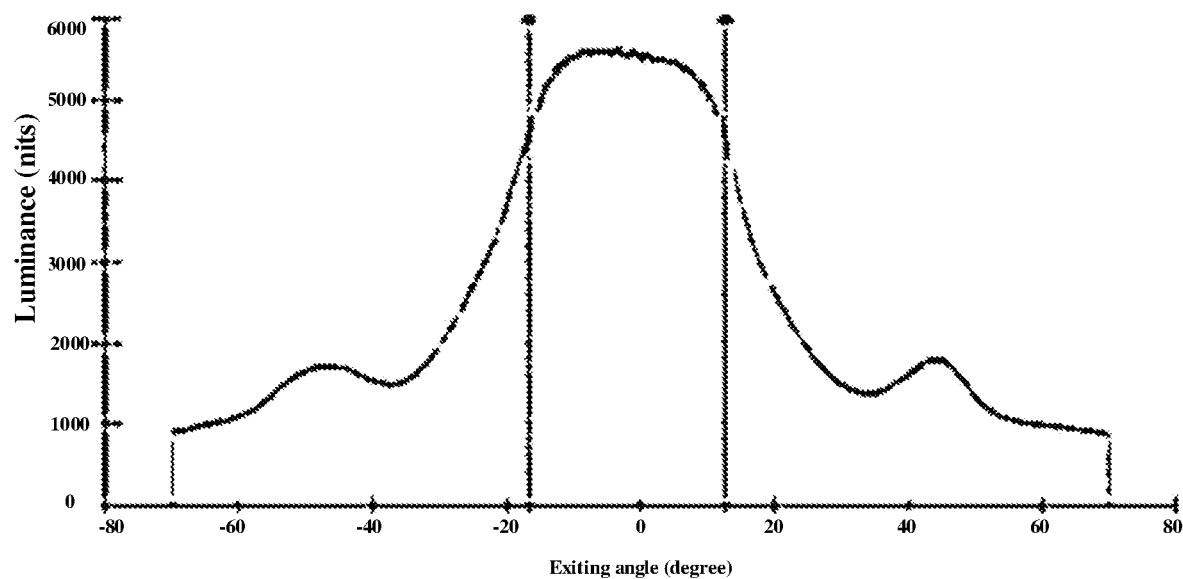
FIG. 7D shows light convergence of light transmitting through the first light modulation layer depicted in FIG. 7A.

FIG. 7D shows light convergence of light transmitting through the first light modulation layer depicted in FIG. 7A. Referring to FIG. 7D, exiting light at an exiting angle of −10 degrees has a maximum luminance value. Exiting light having luminance at least equal to or greater than 80% of the maximum luminance is limited to an exiting angle in a range of −18 degrees to 18 degrees.

Figure 7E:
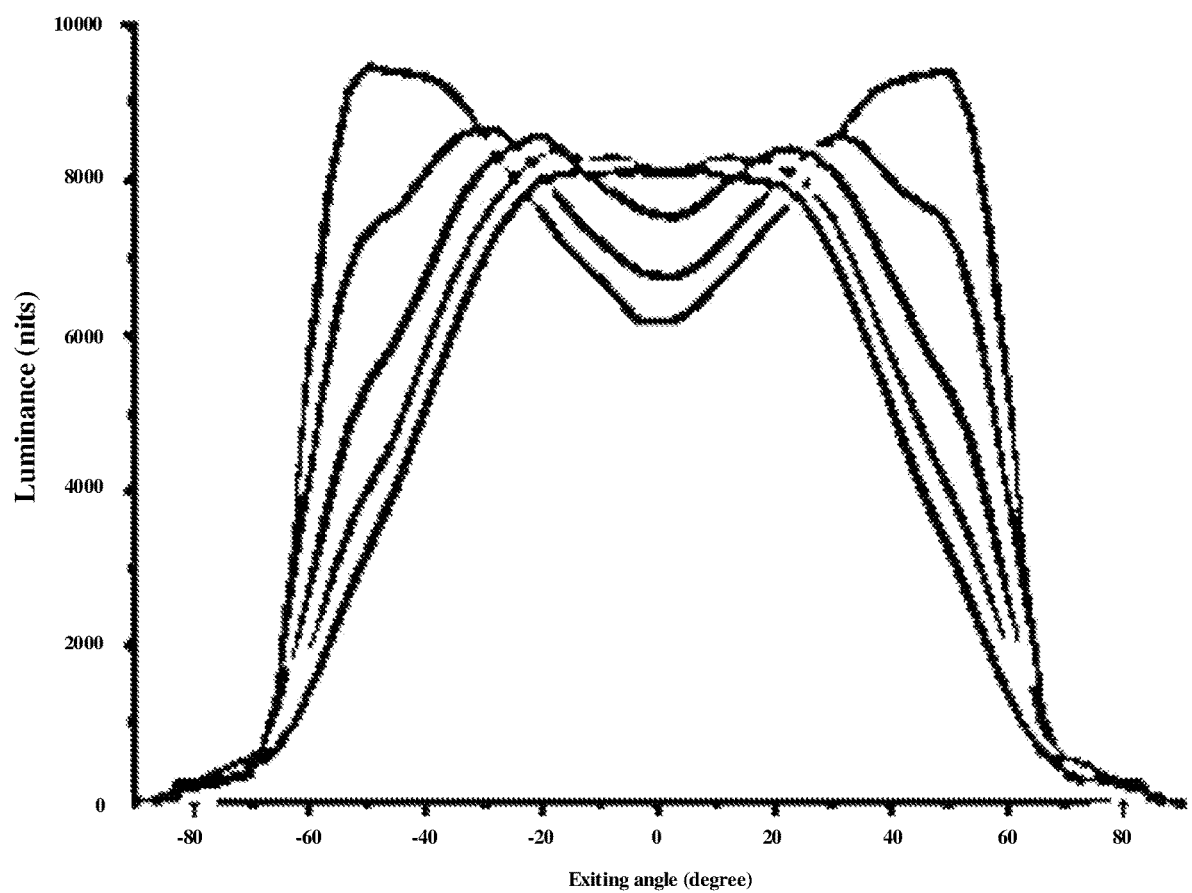
FIG. 7E shows light convergence of light transmitting through a first light modulation layer in some embodiments according to the present disclosure.
Figure 7F:
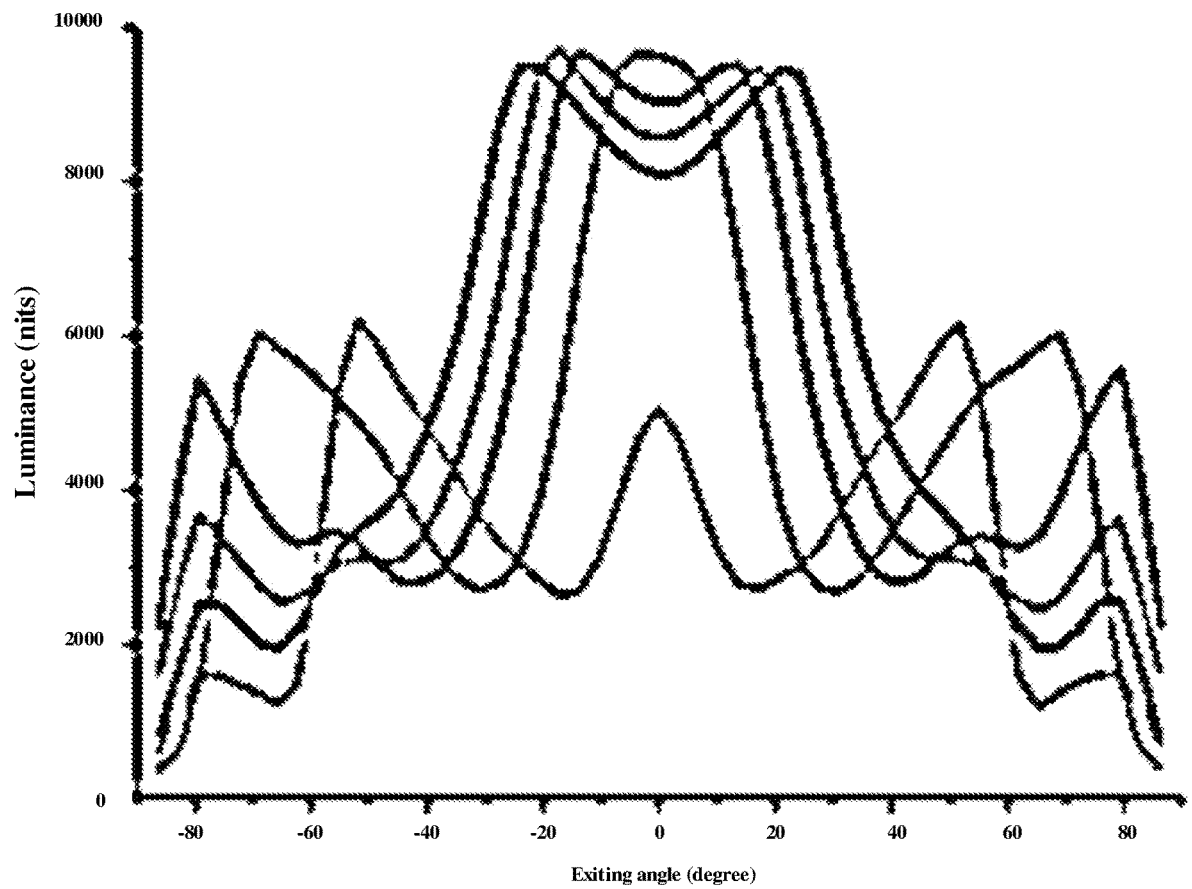
FIG. 7F shows light convergence of light transmitting through a first light modulation layer in some embodiments according to the present disclosure.

Various parameters of the first light modulation layer may be adjusted to change the range of exiting angles. FIG. 7E and FIG. 7F show light convergence of light transmitting through a first light modulation layer in some embodiments according to the present disclosure. FIG. 7E shows the correlation between luminance and exiting angles, different curves in FIG. 7F corresponding to heights of the respective pyramid varying from 5 μm to 25 μm, respectively. FIG. 7F shows the correlation between luminance and exiting angles, different curves in FIG. 7F corresponding to heights of the respective pyramid varying from 30 μm to 100 μm, respectively. As shown in FIG. 7E and FIG. 7F, the range of exiting angles corresponding to exiting light having luminance at least equal to or greater than 80% of the maximum luminance can be adjusted by changing the parameters of the first light modulation layer. FIG. 7E and FIG. 7F show the effect of height of the respective pyramid on the exiting angle. Similarly, the range of exiting angles corresponding to exiting light having luminance at least equal to or greater than 80% of the maximum luminance can be adjusted by changing other parameters such as the vertex angle and/or the base angle of face of the respective pyramid.

FIG. 7A shows a first light modulation layer in which the base of the respective pyramid is on a side of the apex of the respective pyramid away from the light source. Referring to FIG. 7A and FIG. 6A, in some embodiments, the first base substrate BS1 is on a side of the plurality of first protrusions P1 away from the light source LS. Optionally, the plurality of first protrusions P1 is in contact with the insulating layer IN. Optionally, the first base substrate BS1 is in contact with the second light modulation layer LM2.

Figure 8A:
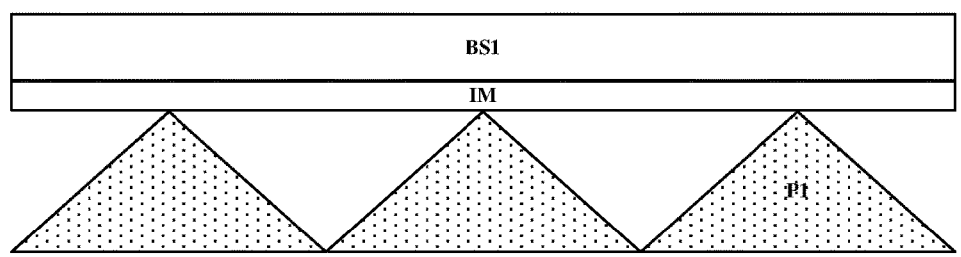
FIG. 8A is a schematic diagram illustrating the structure of a first light modulation layer in some embodiments according to the present disclosure.

FIG. 8A is a schematic diagram illustrating the structure of a first light modulation layer in some embodiments according to the present disclosure. FIG. 8A shows a first light modulation layer in which the apex of the respective pyramid is on a side of the base of the respective pyramid away from the light source.

Referring to FIG. 8A, the first light modulation layer in some embodiments includes a first base substrate BS1 and a plurality of first protrusions P1 on the first base substrate BS1. Optionally, the first light modulation layer further includes an intermediate layer IM on a side of the first base substrate BS1 closer to the plurality of first protrusions P1, and on a side of the plurality of first protrusions P1 closer to the first base substrate BS1.

Referring to FIG. 8A and FIG. 6A, in some embodiments, the first base substrate BS1 is on a side of the plurality of first protrusions P1 away from the light source LS. Optionally, the plurality of first protrusions P1 is in contact with the insulating layer IN. Optionally, the first base substrate BS1 is in contact with the second light modulation layer LM2.

Various appropriate materials may be used for making the first light modulation layer. Examples of appropriate materials for making the first base substrate BS1 include silicon oxide (SiOy), silicon nitride (SiNy, e.g., $Si_3N_4$), silicon oxynitride ($SiO_xN_y$), and organic polymers such as poly (methyl methacrylate). Examples of appropriate materials for making the plurality of first protrusions P1 include photoresist materials. Examples of appropriate materials for making the intermediate layer IM include photoresist materials.

In some embodiments, the plurality of first protrusions P1 are a plurality of pyramids. Referring to FIG. 8A, in some embodiments, a base of a respective pyramid is on a side of an apex of the respective pyramid away from the first base substrate BS1.

Figure 8B:
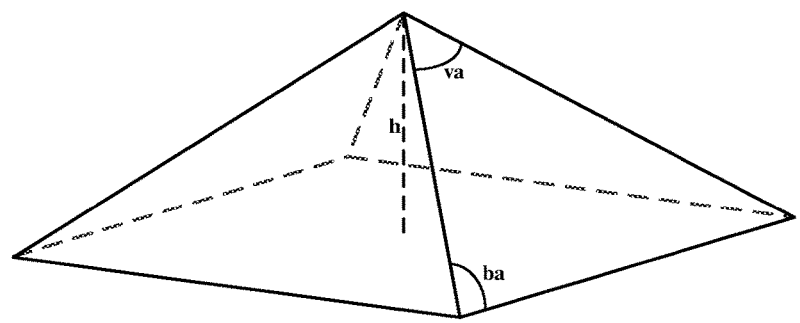
FIG. 8B is a schematic diagram illustrating the structure of a respective pyramid in some embodiments according to the present disclosure.

FIG. 8B is a schematic diagram illustrating the structure of a respective pyramid in some embodiments according to the present disclosure. Referring to FIG. 8B, in some embodiments, a vertex angle va of the respective pyramid is in a range of 100 degrees to 140 degrees, e.g., 100 degrees to 105 degrees, 105 degrees to 110 degrees, 110 degrees to 115 degrees, 115 degrees to 120 degrees, 120 degrees to 125 degrees, 125 degrees to 130 degrees, 130 degrees to 135 degrees, or 135 degrees to 140 degrees.

In some embodiments, a base angle of face ba of the respective pyramid is in a range of 20 degrees to 40 degrees, e.g., 20 degrees to 25 degrees, 25 degrees to 30 degrees, 30 degrees to 35 degrees, or 35 degrees to 40 degrees.

In some embodiments, the respective pyramid has a height in a range of 10 μm to 20 μm, e.g., 10 μm to 12 μm, 12 μm to 14 μm, 14 μm to 16 μm, 16 μm to 18 μm, or 18 μm to 20 μm. In one example the respective pyramid has a height of 15 μm.

In some embodiments, the plurality of pyramids have a pitch in a range of 30 μm to 70 μm, e.g., 30 μm to 35 μm, 35 μm to 40 μm, 40 μm to 45 μm, 45 μm to 50 μm, 50 μm to 55 μm, 55 μm to 60 μm, 60 μm to 65 μm, or 65 μm to 70 μm.

In some embodiments, the plurality of pyramids have duty cycle of at least 80%, e.g., at least 82%, at least 84%, at least 86%, at least 88%, at least 90%, at least 92%, at least 94%, at least 96%, at least 98%, or 100%.

Figure 8C:
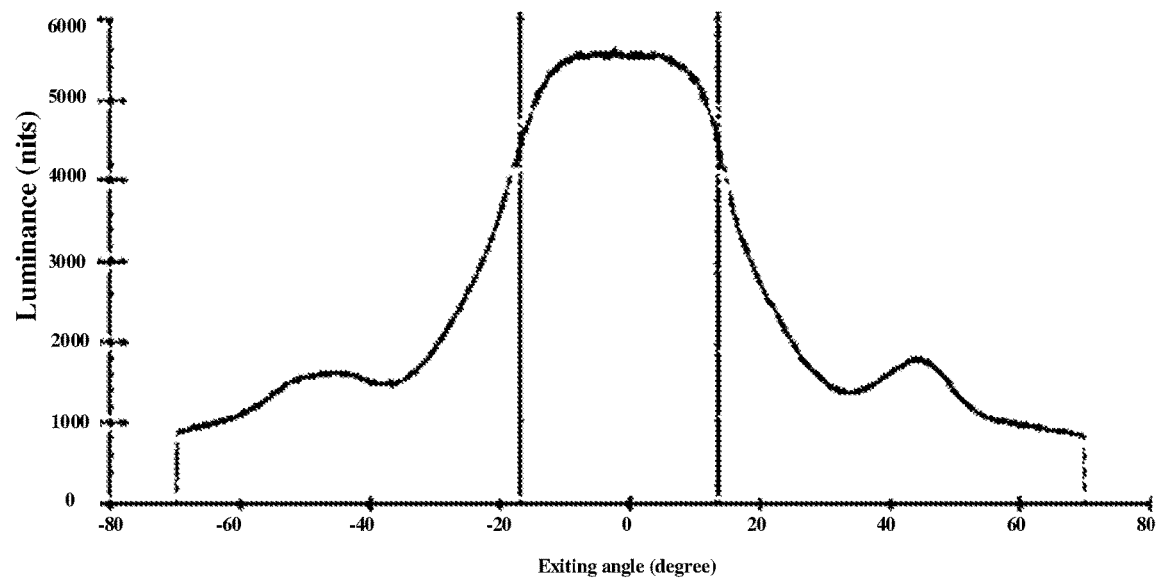
FIG. 8C shows light convergence of light transmitting through the first light modulation layer depicted in FIG. 8A.

FIG. 8C shows light convergence of light transmitting through the first light modulation layer depicted in FIG. 8A. Referring to FIG. 8C, exiting light at an exiting angle of −0 degree has a maximum luminance value. Exiting light having luminance at least equal to or greater than 80% of the maximum luminance is limited to an exiting angle in a range of −18 degrees to 18 degrees.

Figure 9A:
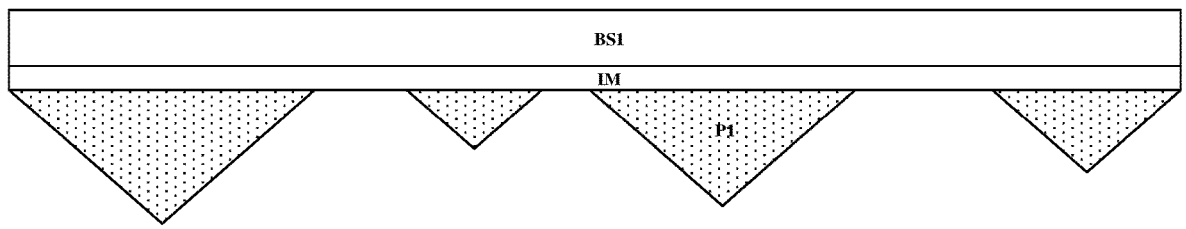
FIG. 9A is a schematic diagram illustrating the structure of a first light modulation layer in some embodiments according to the present disclosure.

FIG. 7A and FIG. 8A show first light modulation layers having substantially uniform pyramids that are substantially uniformly distributed. FIG. 9A is a schematic diagram illustrating the structure of a first light modulation layer in some embodiments according to the present disclosure. FIG. 9A shows a first light modulation layers having non-uniform pyramids. As shown in FIG. 9A, the first light modulation layer in some embodiments includes a first base substrate BS1 and a plurality of first protrusions P1 on the first base substrate BS1. Optionally, the first light modulation layer further includes an intermediate layer IM on a side of the first base substrate BS1 closer to the plurality of first protrusions P1, and on a side of the plurality of first protrusions P1 closer to the first base substrate BS1.

In some embodiments, the plurality of first protrusions P1 are a plurality of pyramids. Referring to FIG. 9A, in some embodiments, the plurality of pyramids are a plurality of non-uniform pyramids. A base of a respective non-uniform pyramid of the plurality of non-uniform pyramids is on a side of an apex of the respective non-uniform pyramid away from the light source. In some embodiments, the plurality of pyramids have different pitches. Optionally, pitches of the plurality of pyramids are in a range of 30 μm to 70 μm, e.g., 30 μm to 35 μm, 35 μm to 40 μm, 40 μm to 45 μm, 45 μm to 50 μm, 50 μm to 55 μm, 55 μm to 60μ, 60 μm to 65 μm, or 65 μm to 70 μm.

In some embodiments, at least two of the plurality of pyramids have different heights. Optionally, heights of the plurality of pyramids are in a range of 5 μm to 25 μm, e.g., 5 μm to 10 μm, 10 μm to 15 μm, 15 μm to 20 μm, or 20 μm to 25 μm.

In some embodiments, a vertex angle va of the respective pyramid is in a range of 100 degrees to 140 degrees, e.g., 100 degrees to 105 degrees, 105 degrees to 110 degrees, 110 degrees to 115 degrees, 115 degrees to 120 degrees, 120 degrees to 125 degrees, 125 degrees to 130 degrees, 130 degrees to 135 degrees, or 135 degrees to 140 degrees.

In some embodiments, a base angle of face ba of the respective pyramid is in a range of 20 degrees to 40 degrees, e.g., 20 degrees to 25 degrees, 25 degrees to 30 degrees, 30 degrees to 35 degrees, or 35 degrees to 40 degrees.

In some embodiments, the plurality of pyramids have duty cycle of at least 80%, e.g., at least 82%, at least 84%, at least 86%, at least 88%, at least 90%, at least 92%, at least 94%, at least 96%, at least 98%, or 100%.

Figure 9B:
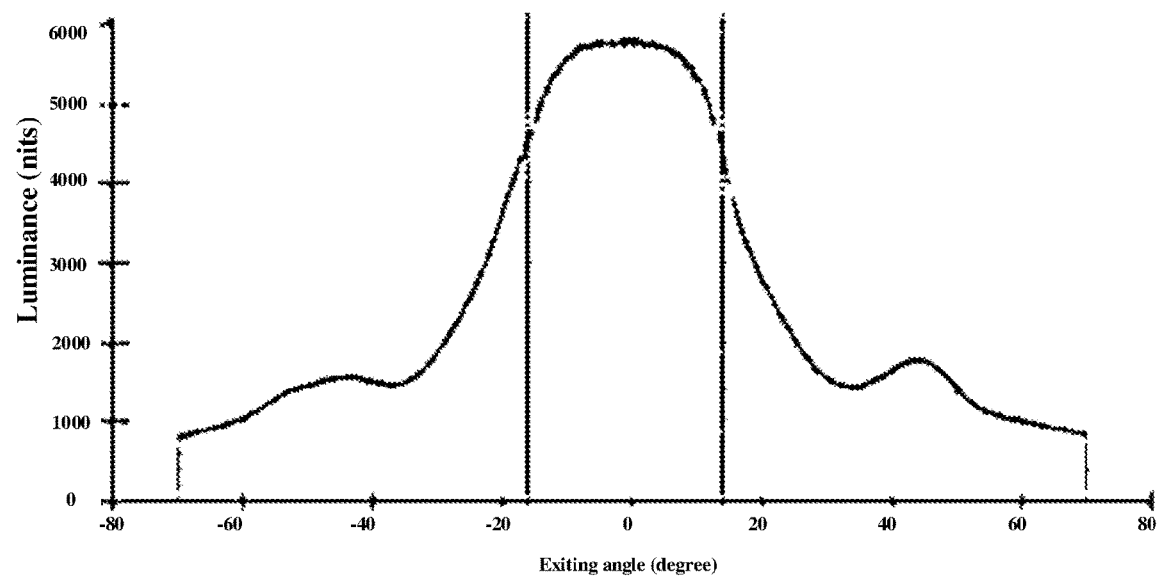
FIG. 9B shows light convergence of light transmitting through the first light modulation layer depicted in FIG. 9A.

FIG. 9B shows light convergence of light transmitting through the first light modulation layer depicted in FIG. 9A. Referring to FIG. 9B, exiting light at an exiting angle of 0 degree has a maximum luminance value. Exiting light having luminance at least equal to or greater than 80% of the maximum luminance is limited to an exiting angle in a range of −18 degrees to 18 degrees.

Figure 9C:
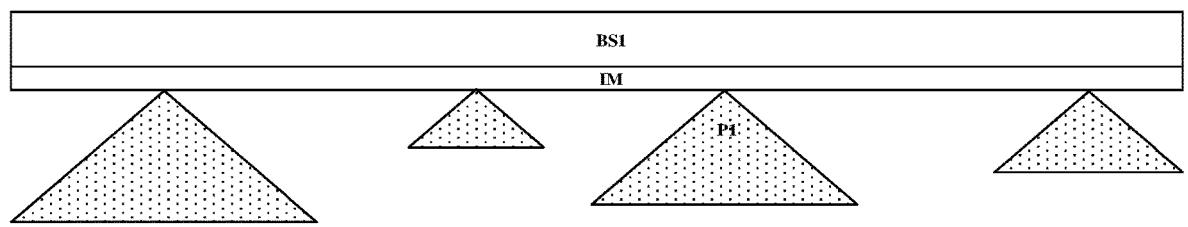
FIG. 9C is a schematic diagram illustrating the structure of a first light modulation layer in some embodiments according to the present disclosure.

FIG. 9C is a schematic diagram illustrating the structure of a first light modulation layer in some embodiments according to the present disclosure. As shown in FIG. 9C, the first light modulation layer in some embodiments includes a first base substrate BS1 and a plurality of first protrusions P1 on the first base substrate BS1. Optionally, the first light modulation layer further includes an intermediate layer IM on a side of the first base substrate BS1 closer to the plurality of first protrusions P1, and on a side of the plurality of first protrusions P1 closer to the first base substrate BS1.

In some embodiments, the plurality of first protrusions P1 are a plurality of pyramids. Referring to FIG. 9C, in some embodiments, the plurality of pyramids are a plurality of non-uniform pyramids. An apex of a respective non-uniform pyramid of the plurality of non-uniform pyramids is on a side of a base of the respective non-uniform pyramid away from the light source. In some embodiments, the plurality of pyramids have different pitches. Optionally, pitches of the plurality of pyramids are in a range of 30 μm to 70 μm, e.g., 30 μm to 35 μm, 35 μm to 40 μm, 40 μm to 45 μm, 45 μm to 50 μm, 50 μm to 55 μm, 55 μm to 60 μm, 60 μm to 65 μm, or 65 μm to 70 μm.

Figure 9D:
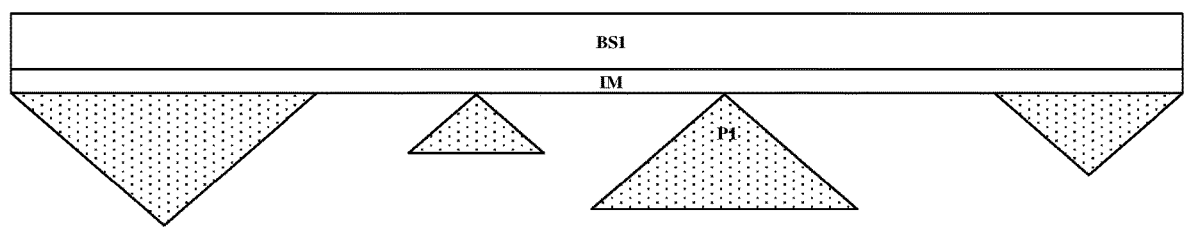
FIG. 9D is a schematic diagram illustrating the structure of a first light modulation layer in some embodiments according to the present disclosure.

FIG. 9D is a schematic diagram illustrating the structure of a first light modulation layer in some embodiments according to the present disclosure. As shown in FIG. 9D, the first light modulation layer in some embodiments includes a first base substrate BS1 and a plurality of first protrusions P1 on the first base substrate BS1. Optionally, the first light modulation layer further includes an intermediate layer IM on a side of the first base substrate BS1 closer to the plurality of first protrusions P1, and on a side of the plurality of first protrusions P1 closer to the first base substrate BS1.

In some embodiments, the plurality of first protrusions P1 are a plurality of pyramids. Referring to FIG. 9D, in some embodiments, the plurality of pyramids are a plurality of non-uniform pyramids. In some embodiments, the plurality of pyramids have different pitches. Optionally, pitches of the plurality of pyramids are in a range of 30 μm to 70 μm, e.g., 30 μm to 35 μm, 35 μm to 40 μm, 40 μm to 45 μm, 45 μm to 50 μm, 50 μm to 55 μm, 55 μm to 60 μm, 60 μm to 65 μm, or 65 μm to 70 μm.

Referring to FIG. 9D, in some embodiments, the plurality of pyramids include a plurality of first pyramids and a plurality of second pyramids. An apex of a respective first pyramid of the plurality of first pyramids is on a side of a base of the respective first pyramid away from the light source. A base of a respective second pyramid of the plurality of second pyramids is on a side of an apex of the respective second pyramid away from the light source.

Figure 10A:
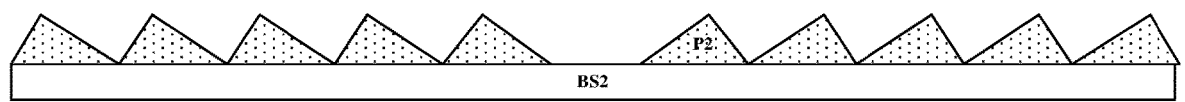
FIG. 10A is a cross-sectional view of a second light modulation layer in some embodiments according to the present disclosure.
Figure 10B:
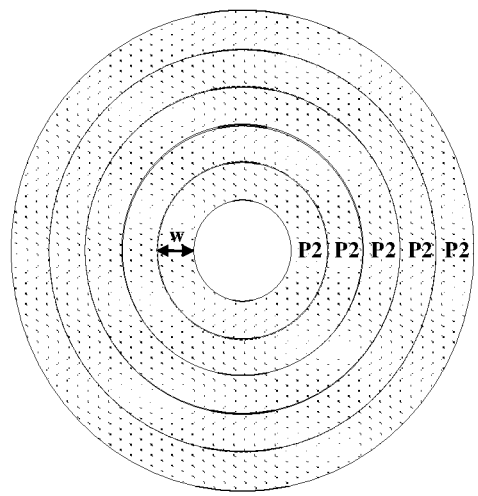
FIG. 10B is a plan view of a second light modulation layer in some embodiments according to the present disclosure.
Figure 10C:
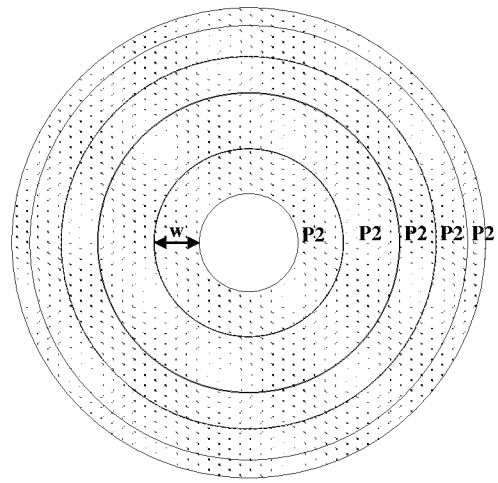
FIG. 10C is a plan view of a second light modulation layer in some embodiments according to the present disclosure.

FIG. 10A is a cross-sectional view of a second light modulation layer in some embodiments according to the present disclosure. FIG. 10B is a plan view of a second light modulation layer in some embodiments according to the present disclosure. FIG. 10C is a plan view of a second light modulation layer in some embodiments according to the present disclosure. Referring to FIG. 10A, the second light modulation layer in some embodiments includes a second base substrate BS2 and a plurality of second protrusions P2 on the second base substrate BS2.

In some embodiments, the plurality of second protrusions P2 are a plurality of ring protrusions. Optionally, the plurality of ring protrusions are concentric. As used herein, the term "ring" refers to a structure or portion of a structure having a hole there through. A ring structure may be formed of a square, rectangle, triangle or another shape with a hole there through, or may be essentially round like a doughnut.

In some embodiments, a central region of the second light modulation layer is absent of a ring protrusion, corresponding to a deflection angle of zero degree for a central region of the display panel in a virtual display apparatus according to the present disclosure. The plurality of ring protrusions depicted in FIG. 10A to FIG. 10C correspond to non-zero deflection angles for non-central regions of the display panel in a virtual display apparatus according to the present disclosure. As discussed previously, in some embodiments, the deflection angles according to Equation (7) gradually (continuously or step-wise) vary (e.g., increase) from the central region to the edge region of the display panel in a virtual display apparatus according to the present disclosure.

Referring to FIG. 10B, the plurality of ring protrusions in some embodiments have a substantially same ring frame width w. By having a substantially same ring frame width w, a fabrication process of the second light modulation layer can be greatly simplified. Referring to FIG. 10C, at least two of the plurality of ring protrusions in some embodiments have different ring frame widths. In another example, ring frame widths of the plurality of ring protrusions gradually increases from the central region to the edge region. In another example, ring frame widths of the plurality of ring protrusions gradually decreases from the central region to the edge region. By having different ring frame widths, various different deflection angles across the display panel can be achieved.

Various appropriate materials may be used for making the second light modulation layer. Examples of appropriate materials for making the second base substrate BS2 include silicon oxide (SiOy), silicon nitride (SiNy, e.g., $Si_3N_4$), silicon oxynitride ($SiO_xN_y$), and organic polymers such as poly(methyl methacrylate). Examples of appropriate materials for making the plurality of second protrusions P2 include photoresist materials.

Figure 11:
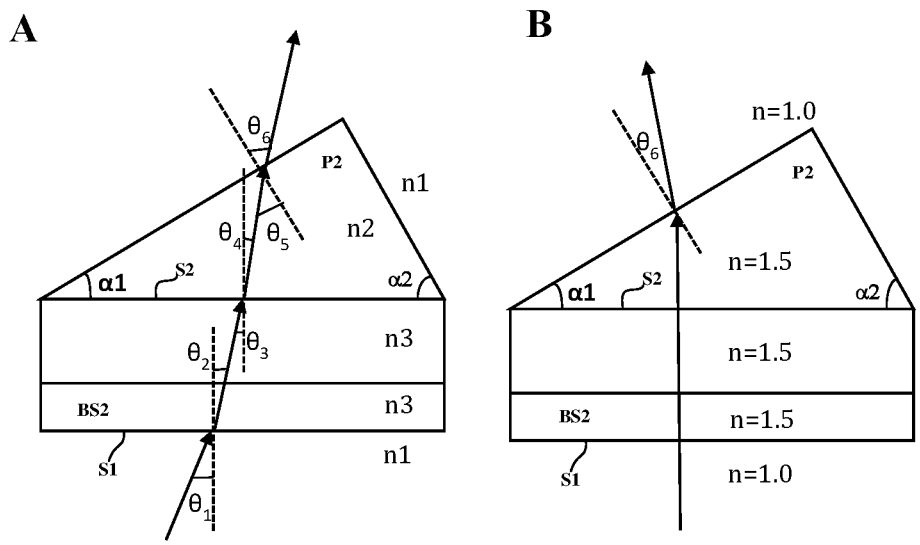
FIG. 11 illustrates deflection of light transmitting through a second light modulation layer in some embodiments according to the present disclosure.

FIG. 11 illustrates deflection of light transmitting through a second light modulation layer in some embodiments according to the present disclosure. A cross-section of a respective ring protrusion of the plurality of ring protrusions is shown in FIG. 11. Referring to FIG. 11A, a deflection angle is denoted as $\theta_6$. The relationship between various angles denoted in FIG. 11 may be determined according to Snell's law.

$$n_1 * \sin \theta_1 = n_2 * \sin \theta_2; \tag{8}$$

$$n_2 * \sin \theta_3 = n_3 * \sin \theta_4; \text{ and} \tag{9}$$

$$n_3 * \sin \theta_5 = n_1 * \sin \theta_6; \tag{10}$$

wherein n1 stands for a refractive index of air, n2 stands for a refractive index of the plurality of second protrusions P2, and n3 stands for a refractive index of the second base substrate BS2. In one example, the plurality of second protrusions P2 are made of a photoresist material, and n2 is a refractive index of the photoresist material.

Optionally, the refractive index of the plurality of second protrusions P2 is greater than the refractive index of the second base substrate BS2. In one example, n2 is in a range of 1.60 to 1.80, and n3 is in a range of 1.50 to 1.60. The refractive index of the second base substrate BS2 is greater than the refractive index of air.

In some embodiments, a lower surface S1 and an upper surface S2 of the second base substrate BS2 are substantially parallel to each other. Thus, $\theta_3=\theta_1-\theta_2$, and $\theta_4=\theta_5$. Accordingly:

$$n_1 * \sin \theta_6 = n_3 * \sin \theta_5 = n_3 * \sin \theta_4 = n_2 * \sin \theta_3 = n_2 * \sin (\theta_1 - \theta_2).$$

The deflection angle $\theta_6$ is correlated to $\theta_1$, $\theta_2$, n1, and n2. The deflection angle $\theta_6$ is not correlated to a thickness of the second base substrate BS2, is not related to a distance between a respective second protrusion and the second base substrate BS2. The deflection angle $\theta_6$ is only indirectly correlated to the refractive index $n_3$ of the second base substrate BS2 because it is correlated to the value of $\theta_1-\theta_2$.

In some embodiments, in a cross-section along a plane perpendicular to a surface of the second base substrate BS2 and intersecting the plurality of second protrusions (e.g., a cross-section as depicted in FIG. 11), the respective ring protrusion has a first base angle $\alpha 1$ and a second base angle $\alpha 2$. Optionally, $\alpha 1$ and $\alpha 2$ are different from each other. Optionally, $\alpha 2$ is greater than $\alpha 1$, wherein the first base angle $\alpha 1$ is on a side of the second base angle $\alpha 2$ closer to a central region of the second light modulation layer.

FIG. 11B illustrates a simplified case of the second light modulation layer in which the refractive index of the second base substrate BS2 and the refractive index of the respective ring protrusion are substantially the same. In one example, the refractive indexes of the second base substrate BS2 and the respective ring protrusion are both 1.5. In the simplified case, the deflection angle $\theta 2$ is the same as the first base angle $\alpha 1$.

Figure 12:
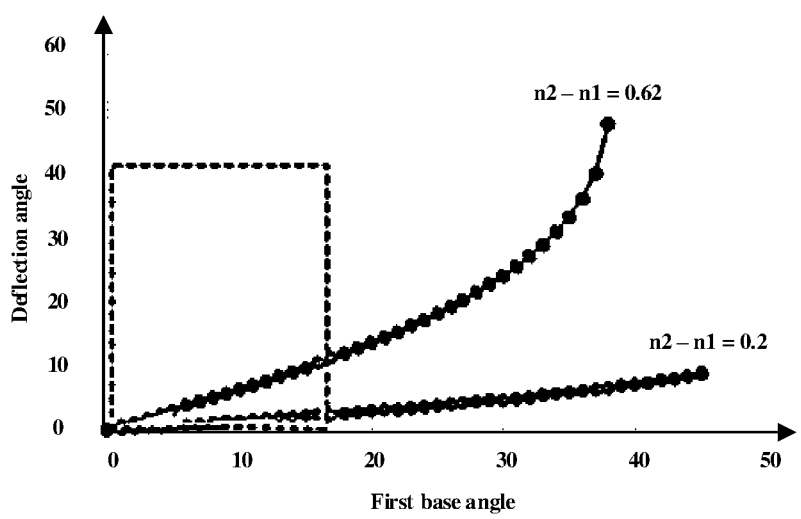
FIG. 12 illustrates a correlation between a deflection angle and a base angle of a respective ring protrusion in some embodiments according to the present disclosure.

FIG. 12 illustrates a correlation between a deflection angle and a base angle of a respective ring protrusion in some embodiments according to the present disclosure. Referring to FIG. 12, the greater the first base angle, the greater the deflection angle is. Moreover, a difference between $n_1$ and $n_2$ affects the deflection angle. The greater the difference, the greater the deflection angle is. The dotted line in FIG. 12 denotes the deflection angle in a range of 0 degree to 16 degrees. Thus, the present second light modulation layer may achieve a wide range of deflection angles, which is needed for a display panel that is particularly small in size, or particularly large in size. For a display panel that is particularly small in size, it is necessary to deflect the light outward away from the central region of the display panel. For a display panel that is particularly large in size, it is necessary to deflect the light inward closer to the central region of the display panel. In one example, the deflection angle is in a range of −16 degrees to 16 degrees.

Figure 13:
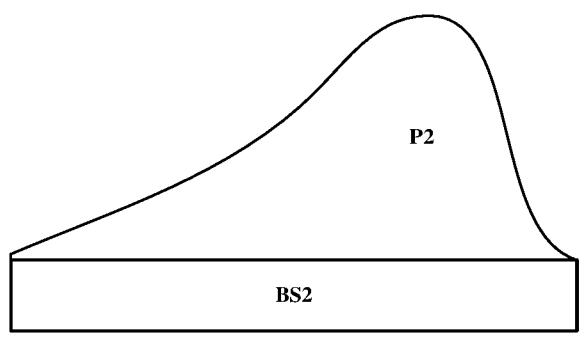
FIG. 13 is a cross-sectional view of a respective ring protrusion in some embodiments according to the present disclosure.

The respective ring protrusion may be various appropriate shapes. Referring to FIG. 11, the cross-section of the respective ring protrusion in some embodiments has a triangular shape. FIG. 13 is a cross-sectional view of a respective ring protrusion in some embodiments according to the present disclosure. Referring to FIG. 13, the cross-section of the respective ring protrusion in some embodiments has a free-form curved surface. Although the respective ring protrusion has a free-form curved surface, deflection of light transmitting through the respective ring protrusion depicted in FIG. 13 is largely similar to that depicted in FIG. 11. For example, various angles ($\theta_1$ to $\theta_6$) depicted in FIG. 11 are substantially the same as corresponding angles in the respective ring protrusion depicted in FIG. 13.

Various appropriate methods may be used for fabricating the first light modulation layer and the second light modulation layer. In one example, the first light modulation layer and/or the second light modulation layer may be fabricated by patterning a light modulation material (e.g., a photoresist material) deposited on a base substrate material. In another example, the first light modulation layer and/or the second light modulation layer may be pre-fabricated separately, and attached to the light emitting substrate subsequently. For example, the first light modulation layer and/or the second light modulation layer may be stacked onto the light emitting substrate by electrostatic force. In another example, the first light modulation layer and/or the second light modulation layer may be stacked onto the light emitting substrate using an adhesive layer. In another example, the first light modulation layer and/or the second light modulation layer may be stacked onto the light emitting substrate by a nano-imprinting process. In another example, the first light modulation layer and/or the second light modulation layer may be stacked onto the light emitting substrate by a roll-to-roll process. The first base substrate and/or the second base substrate may be made of an organic polymer such as polyethylene terephthalate, polyvinyl chloride, and poly (methyl methacrylate).

Figure 14A:
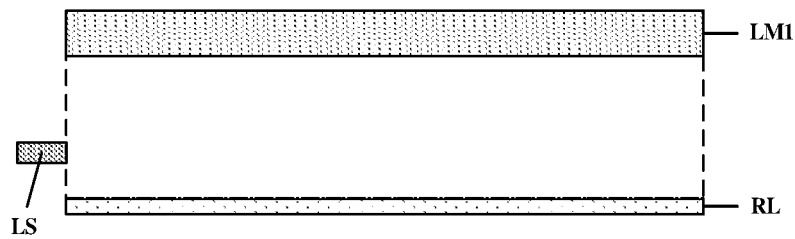
FIG. 14A is a schematic diagram illustrating the structure of a light emitting substrate in a virtual display apparatus in some embodiments according to the present disclosure.
Figure 14B:
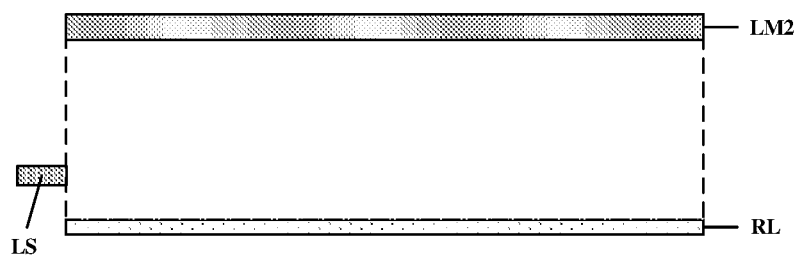
FIG. 14B is a schematic diagram illustrating the structure of a light emitting substrate in a virtual display apparatus in some embodiments according to the present disclosure.
Figure 14C:
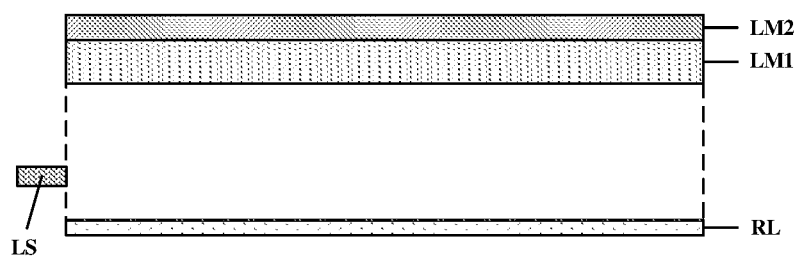
FIG. 14C is a schematic diagram illustrating the structure of a light emitting substrate in a virtual display apparatus in some embodiments according to the present disclosure.
Figure 14D:
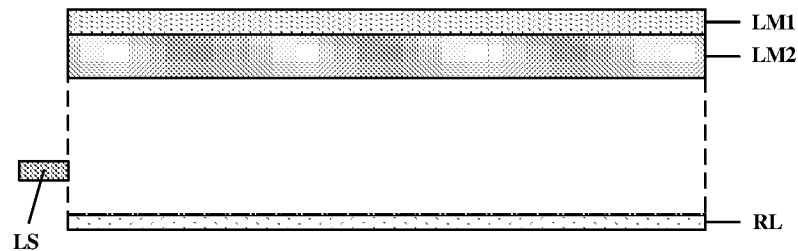
FIG. 14D is a schematic diagram illustrating the structure of a light emitting substrate in a virtual display apparatus in some embodiments according to the present disclosure.
Figure 14E:
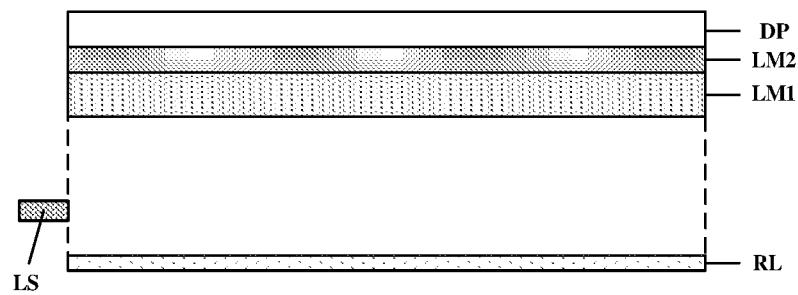
FIG. 14E is a schematic diagram illustrating the structure of a virtual display apparatus in some embodiments according to the present disclosure.
Figure 14F:
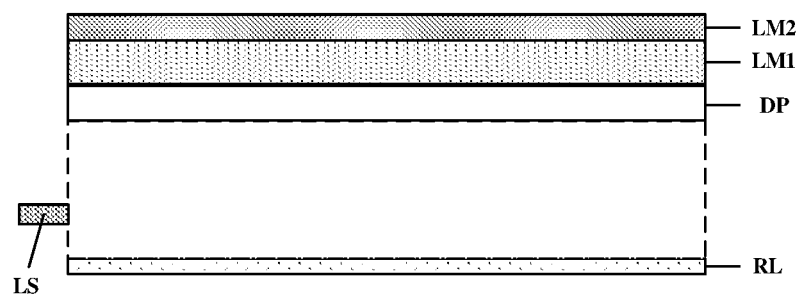
FIG. 14F is a schematic diagram illustrating the structure of a virtual display apparatus in some embodiments according to the present disclosure.
Figure 15:
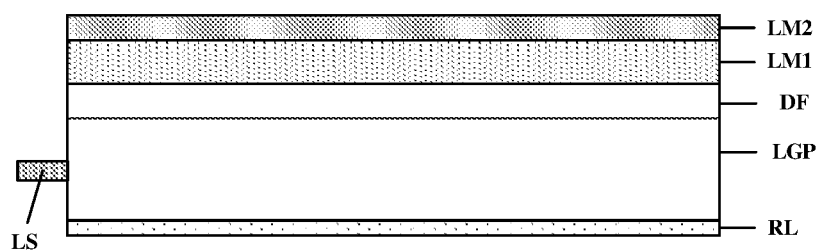
FIG. 15 is a schematic diagram illustrating the structure of a light emitting substrate in a virtual display apparatus in some embodiments according to the present disclosure.

FIG. 14A is a schematic diagram illustrating the structure of a light emitting substrate in a virtual display apparatus in some embodiments according to the present disclosure. FIG. 14B is a schematic diagram illustrating the structure of a light emitting substrate in a virtual display apparatus in some embodiments according to the present disclosure. FIG. 14C is a schematic diagram illustrating the structure of a light emitting substrate in a virtual display apparatus in some embodiments according to the present disclosure. FIG. 14D is a schematic diagram illustrating the structure of a light emitting substrate in a virtual display apparatus in some embodiments according to the present disclosure. FIG. 14E is a schematic diagram illustrating the structure of a virtual display apparatus in some embodiments according to the present disclosure. FIG. 14F is a schematic diagram illustrating the structure of a virtual display apparatus in some embodiments according to the present disclosure. FIG. 15 is a schematic diagram illustrating the structure of a light emitting substrate in a virtual display apparatus in some embodiments according to the present disclosure. FIG. 5A to FIG. 5F, and FIG. 6A to FIG. 6B show embodiments of a direct-lit light emitting substrate and a virtual display apparatus thereof. FIG. 14A to FIG. 14F, and FIG. 15 show embodiments of an edge-lit light emitting substrate and a virtual display apparatus thereof.

Referring to FIG. 5A, the light emitting substrate in some embodiments includes a reflective layer RL, a light source LS (an edge-lit light source for providing indirect light) on the reflective layer RL, a first light modulation layer LM1 on a side of the light source LS away from the reflective layer RL. In some embodiments, the first light modulation layer LM1 is configured to converge light. Optionally, the first light modulation layer LM1 is configured to converge light so that light exited from the first light modulation layer LM1 having luminance at least equal to or greater than 80% of the maximum luminance is limited to an exiting angle in a range substantially the same as or less than a range of angles with respect to a surface of the display panel DP of light emitted from subpixels in a respective region (e.g., a central region, an edge region, or any individual region) of the display panel and that can be received by the eye box. Optionally, the first light modulation layer LM1 is configured to converge light so that light exited from the first light modulation layer LM1 having luminance at least equal to or greater than 80% of the maximum luminance is limited to an exiting angle in a range substantially the same as or less than a range of angles according to Equation (6).

Referring to FIG. 14B, the light emitting substrate in some embodiments includes a reflective layer RL, a light source LS (an edge-lit light source for providing indirect light) on the reflective layer RL, a second light modulation layer LM2 on a side of the light source LS away from the reflective layer RL. In some embodiments, the second light modulation layer LM2 is configured to deflect light. Optionally, the second light modulation layer LM2 is configured to deflect light emitted from the light emitting substrate toward a central region of a display panel. Optionally, the second light modulation layer LM2 is configured to deflect light emitted from the light emitting substrate so that the light exits the second light modulation layer LM2 has a deflection angle according to Equation (7).

Referring to FIG. 14C, the light emitting substrate in some embodiments includes a reflective layer RL, a light source LS (an edge-lit light source for providing indirect light) on the reflective layer RL, a first light modulation layer LM1 on a side of the light source LS away from the reflective layer RL, and a second light modulation layer LM2 on a side of the first light modulation layer LM1 away from the light source LS. FIG. 14D is a schematic diagram illustrating the structure of a light emitting substrate in a virtual display apparatus in some embodiments according to the present disclosure. Referring to FIG. 14D, the light emitting substrate in some embodiments includes a reflective layer RL, a light source LS (an edge-lit light source for providing indirect light) on the reflective layer RL, a second light modulation layer LM2 on a side of the light source LS away from the reflective layer RL, and a first light modulation layer LM1 on a side of the second light modulation layer LM2 away from the light source LS. The inventors of the present disclosure discover that a synergistic effect can be achieved with surprisingly enhanced light utilization rate in a virtual display apparatus according to the present disclosure. In some embodiments, the first light modulation layer LM1 is configured to converge light, and the second light modulation layer LM2 is configured to deflect light. Optionally, the first light modulation layer LM1 is configured to converge light so that light exited from the first light modulation layer LM1 having luminance at least equal to or greater than 80% of the maximum luminance is limited to an exiting angle in a range substantially the same as or less than a range of angles with respect to a surface of the display panel of light emitted from subpixels in a respective region (e.g., a central region, an edge region, or any individual region) of the display panel DP and that can be received by the eye box; and the second light modulation layer LM2 is configured to deflect light emitted from the light emitting substrate toward a central region of a display panel. Optionally, the first light modulation layer LM1 is configured to converge light so that light exited from the first light modulation layer LM1 having luminance at least equal to or greater than 80% of the maximum luminance is limited to an exiting angle in a range substantially the same as or less than a range of angles according to Equation (6); and the second light modulation layer LM2 is configured to deflect light emitted from the light emitting substrate so that the light exits the second light modulation layer LM2 has a deflection angle according to Equation (7).

Referring to FIG. 14E, the virtual display apparatus in some embodiments includes a reflective layer RL, a light source LS (an edge-lit light source for providing indirect light) on the reflective layer RL, a first light modulation layer LM1 and/or a second light modulation layer LM2 on a side of the light source LS away from the reflective layer RL, and a display panel DP on a side of the first light modulation layer LM1 and/or the second light modulation layer LM2 away from the light source LS. Light emitted from the light source LS is first modulated by the first light modulation layer LM1 and/or the second light modulation layer LM2, the modulated light is provided to the display panel DP for image display.

Referring to FIG. 14F, the virtual display apparatus in some embodiments includes a reflective layer RL, a light source LS (an edge-lit light source for providing indirect light) on the reflective layer RL, a display panel DP on a side of the light source LS away from the reflective layer RL, and a first light modulation layer LM1 and/or a second light modulation layer LM2 on a side of the display panel DP away from the light source LS. Light emitted from the light source is first provided to the display panel DP, and light transmitted through the display panel DP is subsequently modulated by the first light modulation layer LM1 and/or the second light modulation layer LM2.

Referring to FIG. 15, the light emitting substrate in some embodiments includes a reflective layer RL, a light guide plate LGP on the reflective layer RL, a light source LS (an edge-lit light source for providing indirect light) on an edge of the light guide plate LGP, a diffusor film DF on a side of the light guide plate LGP away from the reflective layer RL, a first light modulation layer LM1 on a side of the diffusor film DF away from the light guide plate LGP, and a second light modulation layer LM2 on a side of the first light modulation layer LM1 away from the diffusor film DF. Light modulated by the first light modulation layer LM1 and the second light modulation layer LM2 is converged and deflected.

In some embodiments, the light emitting substrate according to the present disclosure is a light emitting substrate in a light emitting diode display panel, e.g., a mini light emitting diode display panel or a micro light emitting diode display panel.

In some embodiments, the light emitting substrate according to the present disclosure is a back light for providing light to a display panel, e.g., a liquid crystal display panel.

Figure 16A:
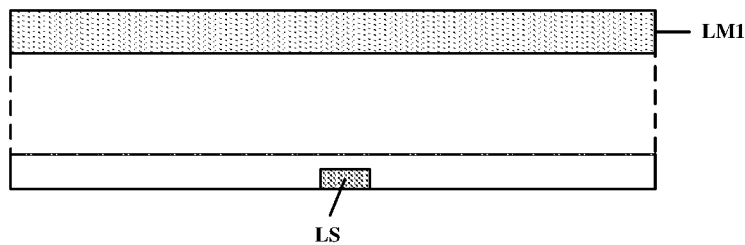
FIG. 16A is a schematic diagram illustrating the structure of a light emitting substrate in a virtual display apparatus in some embodiments according to the present disclosure.

FIG. 16A is a schematic diagram illustrating the structure of a light emitting substrate in a virtual display apparatus in some embodiments according to the present disclosure. Referring to FIG. 16A, the light emitting substrate in some embodiments includes a light source LS, and a first light modulation layer LM1 on the light source LS. In some embodiments, the first light modulation layer LM1 is configured to converge light. Optionally, the first light modulation layer LM1 is configured to converge light so that light exited from the first light modulation layer LM1 having luminance at least equal to or greater than 80% of the maximum luminance is limited to an exiting angle in a range substantially the same as or less than a range of angles with respect to a surface of the display panel of light emitted from subpixels in a respective region (e.g., a central region, an edge region, or any individual region) of the display panel and that can be received by the eye box. Optionally, the first light modulation layer LM1 is configured to converge light so that light exited from the first light modulation layer LM1 having luminance at least equal to or greater than 80% of the maximum luminance is limited to an exiting angle in a range substantially the same as or less than a range of angles according to Equation (6).

Figure 16B:
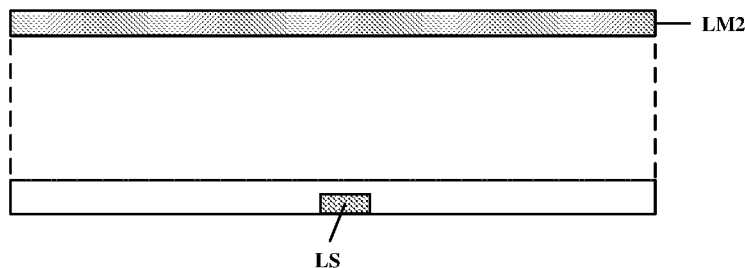
FIG. 16B is a schematic diagram illustrating the structure of a light emitting substrate in a virtual display apparatus in some embodiments according to the present disclosure.

FIG. 16B is a schematic diagram illustrating the structure of a light emitting substrate in a virtual display apparatus in some embodiments according to the present disclosure. Referring to FIG. 16B, the light emitting substrate in some embodiments includes a light source LS, and a second light modulation layer LM2 on the light source LS. In some embodiments, the second light modulation layer LM2 is configured to deflect light. Optionally, the second light modulation layer LM2 is configured to deflect light emitted from the light emitting substrate toward a central region of a display panel. Optionally, the second light modulation layer LM2 is configured to deflect light emitted from the light emitting substrate so that the light exits the second light modulation layer LM2 has a deflection angle according to Equation (7).

Figure 16C:
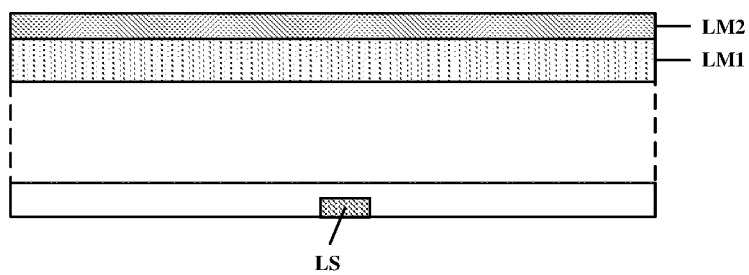
FIG. 16C is a schematic diagram illustrating the structure of a light emitting substrate in a virtual display apparatus in some embodiments according to the present disclosure.
Figure 16D:
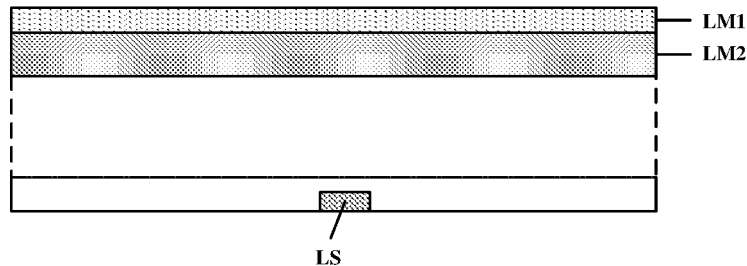
FIG. 16D is a schematic diagram illustrating the structure of a light emitting substrate in a virtual display apparatus in some embodiments according to the present disclosure.

FIG. 16C is a schematic diagram illustrating the structure of a light emitting substrate in a virtual display apparatus in some embodiments according to the present disclosure. Referring to FIG. 16C, the light emitting substrate in some embodiments includes a light source LS, a first light modulation layer LM1 on the light source LS, and a second light modulation layer LM2 on a side of the first light modulation layer LM1 away from the light source LS. FIG. 16D is a schematic diagram illustrating the structure of a light emitting substrate in a virtual display apparatus in some embodiments according to the present disclosure. Referring to FIG. 16D, the light emitting substrate in some embodiments includes a light source LS, a second light modulation layer LM2 on the light source LS, and a first light modulation layer LM1 on a side of the second light modulation layer LM2 away from the light source LS. The inventors of the present disclosure discover that a synergistic effect can be achieved with surprisingly enhanced light utilization rate in a virtual display apparatus according to the present disclosure. In some embodiments, the first light modulation layer LM1 is configured to converge light, and the second light modulation layer LM2 is configured to deflect light. Optionally, the first light modulation layer LM1 is configured to converge light so that light exited from the first light modulation layer LM1 having luminance at least equal to or greater than 80% of the maximum luminance is limited to an exiting angle in a range substantially the same as or less than a range of angles with respect to a surface of the display panel of light emitted from subpixels in a respective region (e.g., a central region, an edge region, or any individual region) of the display panel DP and that can be received by the eye box; and the second light modulation layer LM2 is configured to deflect light emitted from the light emitting substrate toward a central region of a display panel. Optionally, the first light modulation layer LM1 is configured to converge light so that light exited from the first light modulation layer LM1 having luminance at least equal to or greater than 80% of the maximum luminance is limited to an exiting angle in a range substantially the same as or less than a range of angles according to Equation (6); and the second light modulation layer LM2 is configured to deflect light emitted from the light emitting substrate so that the light exits the second light modulation layer LM2 has a deflection angle according to Equation (7).

Figure 17A:
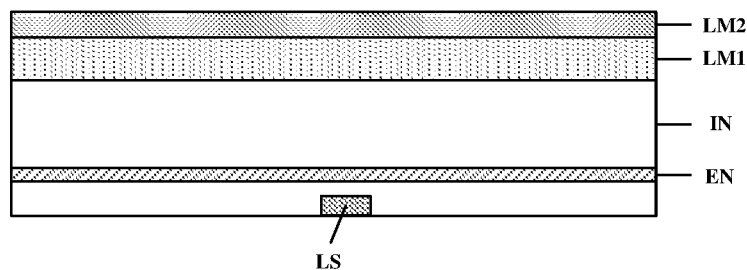
FIG. 17A is a schematic diagram illustrating the structure of a light emitting substrate in a virtual display apparatus in some embodiments according to the present disclosure.
Figure 17B:
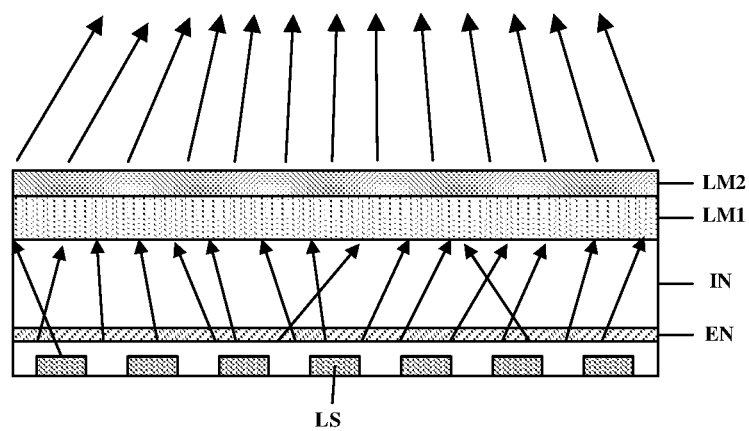
FIG. 17B illustrates a light path of light emitted from the light emitting substrate depicted in FIG. 17A.

FIG. 17A is a schematic diagram illustrating the structure of a light emitting substrate in a virtual display apparatus in some embodiments according to the present disclosure. FIG. 17B illustrates a light path of light emitted from the light emitting substrate depicted in FIG. 17A. Referring to FIG. 17A and FIG. 17B, the light emitting substrate in some embodiments includes a light source LS, and an encapsulating layer EN on the light source LS. The encapsulating layer EN encapsulates the light source LS.

In some embodiments, the light emitting substrate further includes an insulating layer IN on a side of the encapsulating layer EN away from the light source LS, a first light modulation layer LM1 on a side of the insulating layer IN away from the encapsulating layer EN, and a second light modulation layer LM2 on a side of the first light modulation layer LM1 away from the insulating layer IN. As shown in FIG. 17B, light modulated by the first light modulation layer LM1 and the second light modulation layer LM2 is converged and deflected.

In another aspect, the present disclosure provides a method of fabricating a light emitting substrate. In some embodiments, the method includes providing a light source, forming a first light modulation layer having a first micro structure on a side closer to the light source; and forming a second light modulation layer having a second micro structure on a side away from the light source. Optionally, the first light modulation layer is configured to converge light. Optionally, the second light modulation layer is configured to deflect light.

In another aspect, the present disclosure provides a method of fabricating a virtual display apparatus. In some embodiments, the method includes providing a display panel; providing a lens; providing a light source; providing a reflective layer configured to reflect light emitted from the light source; and forming at least one of a first light modulation layer or a second light modulation layer on a side of the light source away from the reflective layer. Optionally, the first light modulation layer is configured to converge light. Optionally, the second light modulation layer is configured to deflect light.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light emitting substrate, comprising:
a light source;
a first light modulation layer having a first micro structure on a side closer to the light source; and
a second light modulation layer having a second micro structure on a side away from the light source;
wherein the second light modulation layer comprises a second base substrate and a plurality of second protrusions on the second base substrate; and
the plurality of second protrusions are a plurality of ring protrusions surrounding a central region of the second light modulation layer.

2. The light emitting substrate of claim 1, wherein the first light modulation layer is configured to converge light; and the second light modulation layer is configured to deflect light.

3. The light emitting substrate of claim 2, wherein the second light modulation layer is on a side of the first light modulation layer away from the light source.

4. A light emitting substrate, comprising:
a light source;
a first light modulation layer having a first micro structure on a side closer to the light source; and
a second light modulation layer having a second micro structure on a side away from the light source;
wherein the first light modulation layer is configured to converge light; and
the second light modulation layer is configured to deflect light;
wherein the first light modulation layer is on a side of the second light modulation layer away from the light source.

5. The light emitting substrate of claim 1, wherein the first light modulation layer comprises a first base substrate and a plurality of first protrusions on the first base substrate; and
a refractive index of the plurality of first protrusions is greater than a refractive index of the first base substrate.

6. The light emitting substrate of claim 5, wherein the plurality of first protrusions are a plurality of pyramids.

7. The light emitting substrate of claim 6, wherein an apex of a respective pyramid of the plurality of pyramids is on a side of a base of the respective pyramid closer to the light source; and
the base of a respective pyramid is in contact with the first base substrate, or in contact with an intermediate layer on a side of the plurality of pyramids closer to the first base substrate.

8. The light emitting substrate of claim 6, wherein an apex of a respective pyramid of the plurality of pyramids is on a side of a base of the respective pyramid away from the light source; and
the apex of a respective pyramid is in contact with the first base substrate, or in contact with an intermediate layer on a side of the plurality of pyramids closer to the first base substrate.

9. The light emitting substrate of claim 6, wherein the plurality of pyramids are a plurality of non-uniform pyramids;
wherein at least two of the plurality of pyramids have different pitches; and/or
wherein an apex of at least a first pyramid of the plurality of pyramids is on a side of a base of the first pyramid closer to the light source, and an apex of at least a second pyramid of the plurality of pyramids is on a side of a base of the second pyramid away from the light.

10. The light emitting substrate of claim 1, wherein ring frame widths of the plurality of ring protrusions gradually change from the central region to an edge region of the second light modulation layer.

11. The light emitting substrate of claim 1, wherein the central region of the second light modulation layer is absent of a ring protrusion.

12. The light emitting substrate of claim 1, wherein, in a cross-section along a plane perpendicular to a surface of the second base substrate and intersecting the plurality of second protrusions, a respective ring protrusion of the plurality of ring protrusions has a triangular shape.

13. The light emitting substrate of claim 1, wherein a refractive index of the plurality of ring protrusions is greater than a refractive index of the second base substrate.

14. A display apparatus, comprising the light emitting substrate of claim 1; and one or more integrated circuits.

15. The display apparatus of claim 14, wherein the light source is configured to emit light along a direction toward the first modulation layer and the second modulation layer; and the light emitting substrate is part of a display panel of the display apparatus.

16. The display apparatus of claim 14, further comprising:
a display panel;
a lens; and
a reflective layer configured to reflect light emitted from the light source;
wherein at least one of a first light modulation layer or a second light modulation layer on a side of the light source away from the reflective layer;
the first light modulation layer is configured to converge light; and
the second light modulation layer is configured to deflect light.

17. A display apparatus, comprising:
a light emitting substrate;
one or more integrated circuits;
a display panel;
a lens; and
a reflective layer configured to reflect light emitted from the light source;
wherein the light emitting substrate comprises:
a light source;
a first light modulation layer having a first micro structure on a side closer to the light source; and
a second light modulation layer having a second micro structure on a side away from the light source;
wherein at least one of a first light modulation layer or a second light modulation layer on a side of the light source away from the reflective layer;
the first light modulation layer is configured to converge light; and
the second light modulation layer is configured to deflect light;
wherein the first light modulation layer is configured to converge light so that light exited from the first light modulation layer having luminance at least equal to or greater than 80% of a maximum luminance is limited to an exiting angle in a range substantially the same as or less than a range of angles with respect to a surface of the display panel of light emitted from subpixels in a respective region of the display panel and that can be received by an eye box;
wherein an absolute maximum value of the range of angles is defined by:

$$\tan^{-1}\left(\frac{f}{\frac{h}{2} - \left(a + \frac{d}{2}\right)}\right) - \tan^{-1}\left(\frac{f}{\frac{h}{2} - \left(a - \frac{d}{2}\right)}\right);$$

wherein h stands for a width of the display panel, a stands for a radius of the lens minus a radius of the eye box, f stands for a focal length of the lens, and d stands for a diameter of the eye box.

18. The display apparatus of claim 17, wherein the range of angles is between -9 degrees and 9 degrees.

19. The display apparatus of claim 16, wherein light deflected by the second light modulation layer has a deflection angle defined by:

$$\theta = \gamma + \frac{\beta - \gamma}{2} = \frac{1}{2}(\gamma + \beta);$$

wherein $\theta$ stands for the deflection angle, $\beta$ stands for a maximum value of an angle with respect to a surface of the display panel of light emitted from subpixels in a region of the display panel and that can be received by an eye box, and $\gamma$ stands for a minimum value of the angle with respect to the surface of the display panel of light emitted from the subpixels in the region of the display panel and that can be received by the eye box.

* * * * *